(12) United States Patent
Saeki et al.

(10) Patent No.: US 12,458,261 B2
(45) Date of Patent: Nov. 4, 2025

(54) MEDICAL PHOTOMETER

(71) Applicant: NIHON KOHDEN CORPORATION, Tokyo (JP)

(72) Inventors: Kota Saeki, Tokorozawa (JP); Naoki Kobayashi, Tokorozawa (JP)

(73) Assignee: NIHON KOHDEN CORPORATION, Tokyo (JP)

( * ) Notice: Subject to any disclaimer, the term of this patent is extended or adjusted under 35 U.S.C. 154(b) by 989 days.

(21) Appl. No.: 17/620,862

(22) PCT Filed: Jun. 24, 2020

(86) PCT No.: PCT/JP2020/024879
§ 371 (c)(1),
(2) Date: Dec. 20, 2021

(87) PCT Pub. No.: WO2021/002266
PCT Pub. Date: Jan. 7, 2021

(65) Prior Publication Data
US 2022/0338767 A1 Oct. 27, 2022

(30) Foreign Application Priority Data
Jul. 2, 2019 (JP) .................................. 2019-123717

(51) Int. Cl.
*A61B 5/1455* (2006.01)
*A61B 5/00* (2006.01)
*A61B 5/145* (2006.01)

(52) U.S. Cl.
CPC ...... *A61B 5/14552* (2013.01); *A61B 5/14546* (2013.01); *A61B 5/6826* (2013.01);
(Continued)

(58) Field of Classification Search
CPC .............. A61B 5/1455; A61B 5/14551; A61B 5/14552; A61B 5/6826; A61B 5/6843;
(Continued)

(56) References Cited

U.S. PATENT DOCUMENTS 6,400,972 B1 6/2002 Fine
6,587,704 B1 7/2003 Fine et al.
(Continued)

FOREIGN PATENT DOCUMENTS

JP 2002-518075 A 6/2002
JP 2003-265446 A 9/2003
(Continued)

OTHER PUBLICATIONS

Office Action issued Mar. 7, 2023 by the Japan Patent Office in counterpart Japanese Patent Application No. 2019-123717.
(Continued)

*Primary Examiner* — Eric F Winakur
(74) *Attorney, Agent, or Firm* — Sughrue Mion, PLLC

(57) ABSTRACT

An input interface is configured to receive a signal corresponding to a quantity of light that has passed through a living tissue of a subject. A pressurization controller is configured to control a pressurizing operation performed with a pressurization device attached to a body of the subject, thereby changing at least one of a thickness of the living tissue, an amount of blood contained in the living tissue, an amount of cellular interstitial fluid contained in the living tissue, an amount of blood flowing into the living tissue, and an amount of blood flowing out from the living tissue. A processor is configured to acquire, from a temporal change of the signal due to the pressurizing operation, a feature quantity that is used for estimating at least one of a physiological state of the living tissue and a disease state of the subject.

2 Claims, 7 Drawing Sheets

(52) U.S. Cl.
CPC .......... *A61B 5/6843* (2013.01); *A61B 5/7242* (2013.01); *A61B 5/7246* (2013.01); *A61B 5/7267* (2013.01); *A61B 5/74* (2013.01)

(58) Field of Classification Search
CPC ... A61B 5/7242; A61B 5/7246; A61B 5/7267; A61B 5/74
See application file for complete search history.

(56) References Cited

U.S. PATENT DOCUMENTS

| | | |
|---|---|---|
| 2003/0212316 A1 | 11/2003 | Leiden et al. |
| 2003/0236647 A1 | 12/2003 | Yoon et al. |
| 2004/0249252 A1* | 12/2004 | Fine .................. A61B 5/14551 600/335 |
| 2004/0267140 A1 | 12/2004 | Ito et al. |
| 2011/0029248 A1 | 2/2011 | Saeed et al. |
| 2014/0213865 A1 | 7/2014 | Kobayashi et al. |
| 2015/0109617 A1 | 4/2015 | Gilbert et al. |
| 2015/0119661 A1 | 4/2015 | Gilbert et al. |
| 2017/0014075 A1 | 1/2017 | Morimura et al. |
| 2017/0322084 A1 | 11/2017 | Haider et al. |
| 2019/0033135 A1 | 1/2019 | Haider et al. |

FOREIGN PATENT DOCUMENTS

| | | |
|---|---|---|
| JP | 4196209 B2 | 12/2008 |
| JP | 2011-510784 A | 4/2011 |
| JP | 2014-147473 A | 8/2014 |
| JP | 2015-519556 A | 7/2015 |
| WO | 2015/137151 A1 | 9/2015 |

OTHER PUBLICATIONS

Office Action dated Jan. 17, 2024, issued by the Japanese Patent Office in Japanese Application No. 2019-123717.
International Search Report (PCT/ISA/210) issued Sep. 29, 2020 by the International Searching Authority in counterpart International Patent Application No. PCT/JP2020/024879.
Written Opinion (PCT/ISA/237) issued Sep. 29, 2020 by the International Searching Authority in counterpart International Patent Application No. PCT/JP2020/024879.

* cited by examiner

MEDICAL PHOTOMETER

TECHNICAL FIELD

The presently disclosed subject matter relates to a medical photometer that is used for estimating at least one of the physiological state of a living tissue and a disease state of a subject.

BACKGROUND ART

Japanese Patent No. 4196209B discloses a pulse photometer that is an example of a medical photometer. A pulse photometer is a device for calculating the arterial oxygen saturation of a subject as an example of the photometry. Specifically, the living tissue of the subject is irradiated with light beams respectively having a plurality of wavelengths at which ratios of the extinction coefficients of the blood are different from each other. The quantities of the light beams of the respective wavelengths that are transmitted through or reflected from the living tissue are subjected to detection. The quantities of the light beams of the respective wavelengths are changed in accordance with the pulsation of the blood of the subject. Accordingly, temporal changes of the quantities of the light beams of the respective wavelengths are acquired as pulse wave signals. The amplitude of the pulse wave signal relating to each of the wavelengths corresponds to the change amount of the light attenuation at the wavelength. The arterial oxygen saturation is calculated based on a ratio of the change amounts of the light attenuation at the wavelengths.

SUMMARY

Technical Problem

It is demanded to enable at least one of the disease state and the physiological state of a living tissue of a subject to be estimated by using the principle of photometry.

Solution to Problem

An illustrative aspect of the presently disclosed subject matter provides a medical photometer comprising:
  an input interface configured to receive a signal corresponding to a quantity of light that has passed through a living tissue of a subject;
  a pressurization controller configured to control a pressurizing operation performed with a pressurization device adapted to be attached to a body of the subject, thereby changing at least one of a thickness of the living tissue, an amount of blood contained in the living tissue, an amount of cellular interstitial fluid contained in the living tissue, an amount of blood flowing into the living tissue, and an amount of blood flowing out from the living tissue;
  a processor configured to acquire, from a temporal change of the signal due to the pressurizing operation, a feature quantity that is used for estimating at least one of a physiological state of the living tissue and a disease state of the subject; and
  an output interface configured to output a signal corresponding to the feature quantity.

With the above configuration, a user can estimate at least one of the physiological state of the living tissue and the disease state of the subject, based on the signal corresponding to the feature quantity obtained through the use of the principle of photometry.

An illustrative aspect of the presently disclosed subject matter provides a medical photometer comprising:
  an input interface configured to receive a signal corresponding to a quantity of light that has passed through a living tissue of a subject;
  a pressurization controller configured to control a pressurizing operation performed with a pressurization device adapted to be attached to a body of the subject, thereby changing at least one of a thickness of the living tissue, an amount of blood contained in the living tissue, an amount of cellular interstitial fluid contained in the living tissue, an amount of blood flowing into the living tissue, and an amount of blood flowing out from the living tissue;
  a processor configured to acquire a feature quantity from a temporal change of the signal due to the pressurizing operation, and to perform estimation of at least one of a physiological state of the living tissue and a disease state of the subject on the basis of the feature quantity; and an output interface configured to output a signal corresponding to a result of the estimation.

With the above configuration, the medical photometer is able to estimate at least one of the physiological state of the living tissue and the disease state of the subject, based on the signal corresponding to the feature quantity obtained through the use of the principle of photometry.

An illustrative aspect of the presently disclosed subject matter provides a medical photometer comprising:
  an input interface configured to receive a signal corresponding to a quantity of light that has passed through a living tissue of a subject;
  a pressurization controller configured to control a pressurizing operation performed with a pressurization device adapted to be attached to a body of the subject, thereby changing at least one of a thickness of the living tissue, an amount of blood contained in the living tissue, an amount of cellular interstitial fluid contained in the living tissue, an amount of blood flowing into the living tissue, and an amount of blood flowing out from the living tissue;
  a processor configured to perform estimation of at least one of a physiological state of the living tissue and a disease state of the subject on the basis of a temporal change of the signal caused by the pressurizing operation, through the use of a classifier that has learned with training data associated with a relationship between a feature quantity of the signal acquired from each of plural subjects and at least one of the physiological state of the living tissue and the disease state of the each of the subjects; and
  an output interface configured to output a signal corresponding to a result of the estimation.

According to the above configuration, the medical photometer is able to perform empirical estimation of at least one of the physiological state of the living tissue and the disease state of the subject through machine learning with the data obtained from plural subjects in the past. In this case, the flexibility of the system can be enhanced as compared with the strict rule-based estimation.

DESCRIPTION OF EMBODIMENTS

Figure 1:
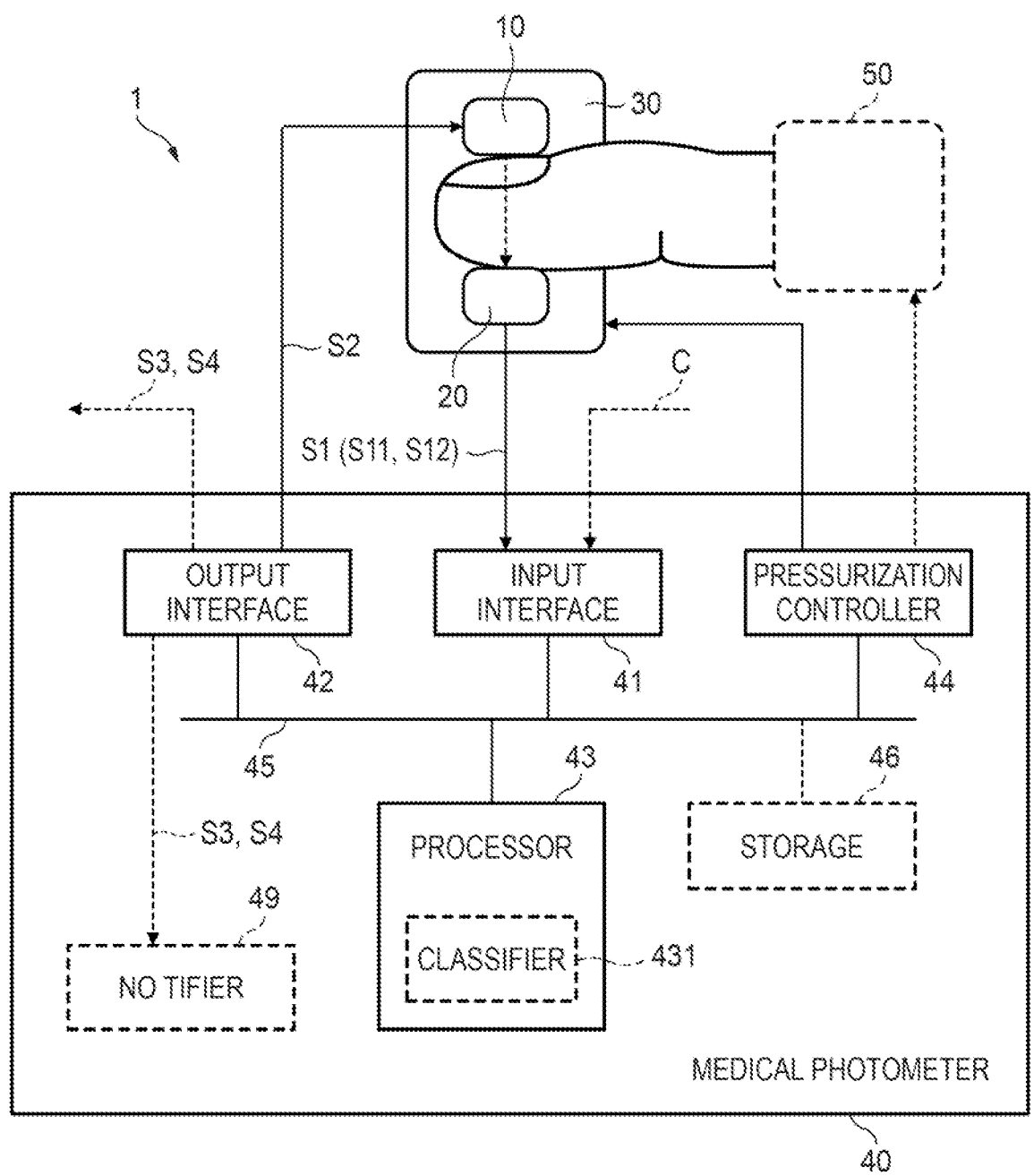
FIG. 1 illustrates a configuration of a medical photometry system according to one embodiment.

Hereinafter, exemplary embodiments will be described in detail with reference to the accompanying drawings. In the drawings, in order to make the sizes of illustrated objects recognizable, the scales of the components are adequately changed.

FIG. 1 illustrates a functional configuration of a medical photometry system 1 according to one embodiment. The medical photometry system 1 may include a photo emitter 10, a photo detector 20, a pressurization device 30, and a medical photometer 40.

The photo emitter 10 may be attached to, for example, a fingertip of the subject. The photo emitter 10 may include at least one light source. The light source is a semiconductor light emitting element that is configured to emit a light beam having a specific wavelength. Examples of the semiconductor light emitting element may include a light emitting diode (LED), a laser diode, and an organic EL element.

The photo detector 20 may be attached to, for example, the fingertip of the subject. The photo detector 20 is placed in a position where the detector can receive the light beam that is emitted from the photo emitter 10, and that is transmitted through the living tissue of the fingertip. In the illustrated example, the photo emitter 10 and the photo detector 20 are placed on the sides that are opposite to each other across a living tissue of the fingertip, respectively. In this case, the photo detector 20 receives the light beam that is emitted from the photo emitter 10, and that is transmitted through the living tissue of the fingertip. The transmittance through the living tissue is an example of the passing through the living tissue.

Alternatively, the photo emitter 10 and the photo detector 20 may be placed on the same side of the living tissue of the fingertip. In this case, the photo detector 20 receives the light beam that is emitted from the photo emitter 10, and that is reflected from the living tissue of the fingertip. The reflection from the living tissue is an example of the passing through the living tissue.

The photo detector 20 is an optical sensor having a sensitivity to the wavelength of the light beam that is emitted from the photo emitter 10. Examples of the optical sensor may include a photodiode, a phototransistor, and a photoresistor. The photo detector 20 is configured to output a signal S1 corresponding to the quantity of the light beam that has passed through the living tissue.

The pressurization device 30 is attached to, for example, the fingertip of the subject. The pressurization device 30 is configured to pressurize the living tissue of the fingertip through which the light beam that is emitted from the photo emitter 10 is passed. The pressurization device 30 may include a cuff that pressurizes the living tissue by an air pressure, an actuator that pressurizes the living tissue by a movable member, or the like.

The press intensity may be determined as a pressure that is sufficiently more than the arterial blood pressure in the living tissue. The air pressure in the case where a cuff is used may be set as, for example, 300 mmHg. The pressing force in the case where an actuator is used may be set as, for example, 500 gf. This causes the blood and cellular interstitial fluid to be eliminated from the pressurized living tissue.

The medical photometer 40 includes an input interface 41, an output interface 42, a processor 43, a pressurization controller 44, and a communication bus 45. The input interface 41, the output interface 42, the processor 43, and the pressurization controller 44 are connected to the bus 45 such that communication from one another can be performed through the communication bus 45.

The processor 43 outputs a control signal S2 for controlling the operation of the photo emitter 10, from the output interface 42. The output interface 42 may include as required an adequate signal conversion circuit. The signal conversion circuit converts the signal or data that are outputted from the processor 43, to the control signal S2 in a form that can cause the photo emitter 10 to operate.

The input interface 41 receives the signal S1 that is outputted from the photo detector 20. The input interface 41 may include as required an adequate signal conversion circuit. The signal conversion circuit converts the signal S1 to a signal or data in a form that enables the processor 43 to execute processing described later.

The pressurization controller 44 is configured to control a pressurizing operation performed by the pressurization device 30 that is attached to the body of the subject, thereby changing at least one of: the thickness of the living tissue; the amount of blood contained in the living tissue; the amount of cellular interstitial fluid contained in the living tissue; the amount of blood flowing into the living tissue; and the amount of blood flowing out from the living tissue.

In the case where the pressurization device 30 includes a cuff, the pressurization controller 44 may include a pump and a valve that are used for adjusting the air pressure in the cuff. In the case where the pressurization device 30 includes an actuator, the pressurization controller 44 may include a circuit that outputs a control signal for adjusting the displacement amount of the actuator. In this case, the control signal may be outputted from the output interface 42. The operation of the pressurization controller 44 may be controlled by the processor 43.

The processor 43 is configured to acquire at least one feature quantity that is used for estimating at least one of the physiological state of the living tissue and the disease state of the subject, from a temporal change of the signal S1 due to the pressurizing operation performed by the pressurization device 30. The operation of the processor 43 will be described with reference to several specific examples.

Example 1: Estimation of Disease State in which Oxygenation State of Capillary Vascular Bed is Depressed In this example, the photo emitter 10 includes a first light source that emits a red light beam, and a second light source that emits an infrared light beam. The wavelengths of the red and infrared light beams are determined such that the absorbances of hemoglobin in blood are different from each other. Examples of such a wavelength of the red light beam include 660 nm. Examples of such a wavelength of the infrared light beam include 940 nm.

The processor 43 outputs a control signal S2 that causes the photo emitter 10 to alternately emit the red and infrared light beams, from the output interface 42. The photo detector 20 alternately outputs a signal S11 corresponding to the quantity of the red light beam that has passed through the living tissue, and a signal S12 corresponding to the quantity of the infrared light beam that has passed through the living tissue. The input interface 41 alternately receives the signal S11 and the signal S12.

Figure 2A:
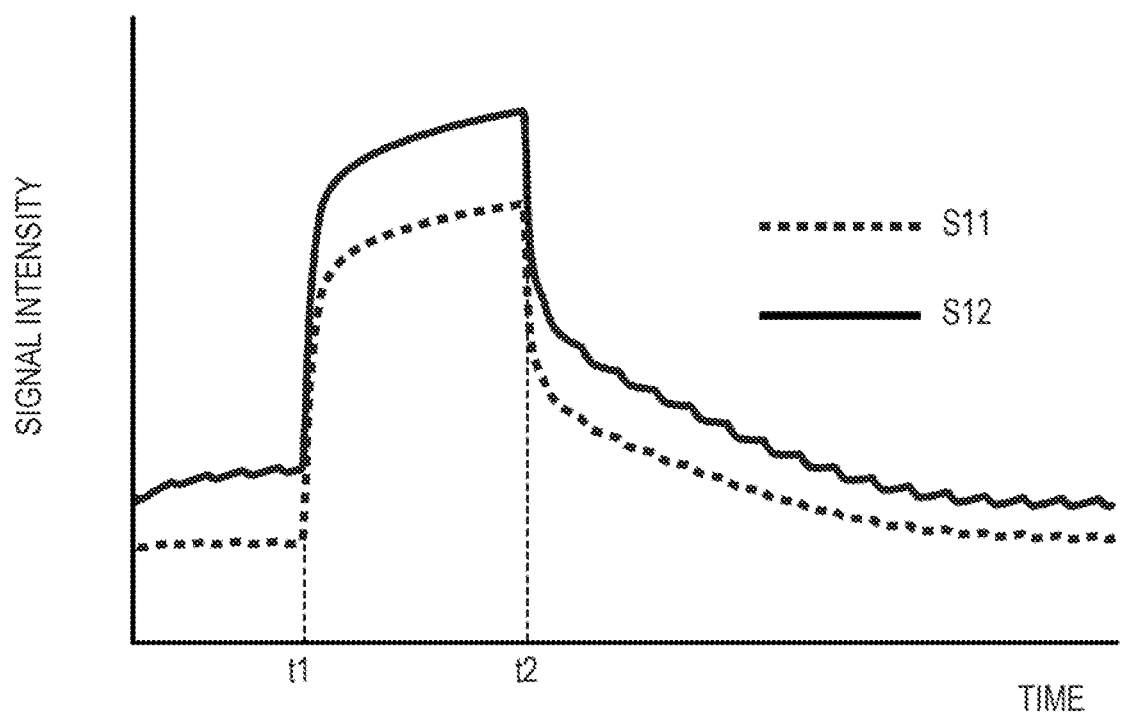
FIG. 2A illustrates an exemplary operation of a medical photometer according to one embodiment.

The processor 43 acquires a temporal change of the intensity of the signal S11, and that of the intensity of the signal S12 while causing the pressurization controller 44 to control the pressurizing operation performed by the pressurization device 30. FIG. 2A illustrates the temporal changes of the intensities of the signals S11 and S12 that are acquired as described above.

The reference symbol t1 indicates a time point when the pressurizing operation performed by the pressurization device 30 is started. In accordance with the pressurization, the thickness of the living tissue is reduced, and blood is eliminated. In the photo detector 20, the received light intensities of the red and infrared light beams are accordingly increased. The intensities of the signals S11 and S12 are increased as well.

The reference symbol t2 indicates a time point when the pressurizing operation performed by the pressurization device 30 is canceled. In accordance with the cancellation of the pressurization, the thickness of the living tissue is recovered, and the eliminated blood returns. In the photo detector 20, the received light intensities of the red and infrared light beams are accordingly decreased. The intensities of the signals S11 and S12 are decreased as well.

Figure 2B:
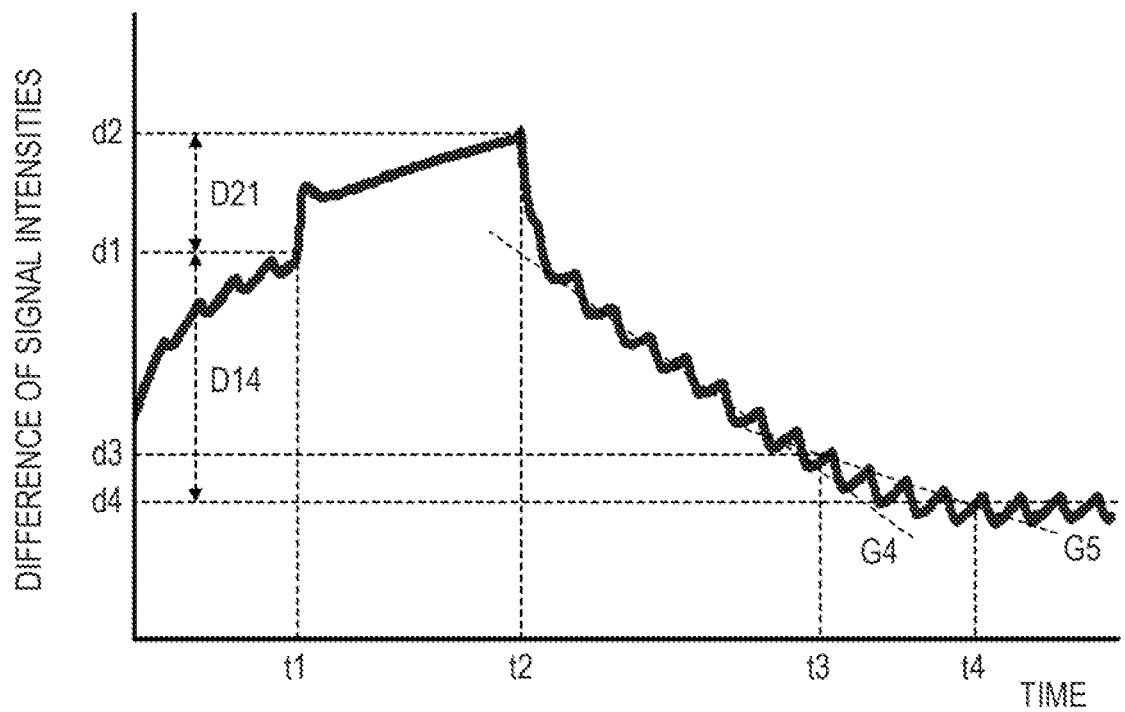
FIG. 2B illustrates an exemplary operation of the medical photometer.

Since the absorbances of hemoglobin with respect to the red and infrared light beams are different from each other, the intensities of the signals S11 and S12 are different from each other. The processor 43 acquires the difference value between the intensities of the signals S11 and S12. FIG. 2B illustrates the temporal change of the difference value that is acquired as described above. The difference value corresponds to the difference between the received light intensities of the red and infrared light beams in the photo detector 20. The difference value may be acquired each time when the signals S11 and S12 are received, or after the acquisitions of the signals S11 and S12 for a specific time period are completed. The difference value between the intensities of the signals S11 and S12 is an example of the first correlation value between the intensities of the signals S11 and S12.

The processor 43 acquires, as the feature quantity, a difference value D21 (=d2−d1) between the difference value d1 at a time point t1 and the difference value d2 at a time point t2. The difference value d1 is an example of the first correlation value that is obtained when the pressurizing operation by the pressurization device 30 is started. The difference value d2 is an example of the first correlation value that is obtained when the pressurizing operation is by the pressurization device 30 is canceled. The difference value D21 is an example of the second correlation value.

The ratio of the intensities of the signals S11 and S12 may be acquired as another example of the first correlation value. In this case, the difference value between the ratios at the time points t1 and t2 is acquired as another example of the second correlation value.

The difference value D21 reflects the oxygenation state of the blood that is eliminated from the living tissue by the pressurization. In a patient with sepsis, for example, a shunt blood flow that flows from an artery to a vein without passing through a capillary vascular bed occurs. When a shunt blood flow occurs, amounts of blood and oxygen that are supplied to the living tissue including the capillary vascular bed are decreased, whereby the blood oxygen saturation of the capillary vascular bed decreases. In this case, the intensity of the signal S12 is increased, and the difference value D21 is accordingly decreased. In a case where the blood oxygen saturation decreases extremely, the difference value D21 may have a negative value.

The processor 43 outputs a notification signal S3 corresponding to the difference value D21 from the output interface 42. As illustrated in FIG. 1, the medical photometer 40 may include a notifier 49. The notifier 49 may perform a notification based on the notification signal S3. The notification is performed by using at least one of visual notification, audible notification, and haptic notification. For example, an index indicating the difference value D21 may be displayed on a display device. Alternatively, in a case where the difference value D21 is less than a prescribed threshold, an adequate index or alarm sound may be displayed or outputted. The notification based on the notification signal S3 may be performed by an apparatus that is remote from the medical photometer 40. In this case, the notification signal S3 is transmitted to the remote apparatus through the output interface 42.

According to the above configuration, the user can estimate that the subject is in a disease state where the oxygenation state of the capillary vascular bed is depressed, through a notification based on the difference value D21. As described above, sepsis is an example of such a disease state.

In place of the output of the notification signal S3 corresponding to the difference value D21, the processor 43 may output a notification signal S4 corresponding to a result of estimation of a disease state where the oxygenation state of the capillary vascular bed is depressed. In this case, the processor 43 is configured to, when the difference value D21 is less than the prescribed threshold, estimate that the subject is in a disease state where the oxygenation state of the capillary vascular bed is depressed.

The notifier 49 may perform a notification based on the notification signal S4. The notification is performed by using at least one of visual notification, audible notification, and haptic notification. For example, an adequate index or alarm sound indicating that sepsis is estimated may be displayed or outputted. The notification based on the notification signal S4 may be performed by an apparatus that is remote from the medical photometer 40. In this case, the notification signal S4 is transmitted to the remote apparatus through the output interface 42.

Example 2: Estimation of Intraperitoneal Bleeding

In this example, the photo emitter 10 includes a first light source that emits a first infrared light beam, and a second light source that emits a second infrared light beam. The wavelength of the first infrared light beam is determined such that a difference between the absorbance of oxygenated hemoglobin in blood and absorbance of deoxygenated hemoglobin is less than a prescribed value. In other words, a wavelength at which the absorbance is hardly affected by a change of the oxygenation state is selected. Examples of such a wavelength of the first infrared light beam include 805 nm. The wavelength of the second infrared light beam is determined such that the absorbance of water is more than the absorbance of hemoglobin. Examples of such a wavelength of the second infrared light beam include 1,300 nm.

The processor 43 outputs a control signal S2 that causes the photo emitter 10 to alternately emit the first and second infrared light beams, from the output interface 42. The photo detector 20 alternately outputs a signal S11 corresponding to the quantity of the first infrared light beam that has passed through the living tissue, and the signal S12 corresponding to the quantity of the second infrared light beam that has passed through the living tissue. The input interface 41 alternately receives the signal S11 and the signal S12. The processor 43 acquires a temporal change of the intensity of the signal S11, and that of the intensity of the signal S12 while causing the pressurization controller 44 to control the pressurizing operation performed by the pressurization device 30.

In the same or similar manner as Example 1, the processor 43 acquires the difference value between the intensities of the signals S11 and S12. As a result, the temporal change of the difference value is as illustrated in FIG. 2B. The difference value between the intensities of the signals S11 and S12 is an example of the correlation value. Another example of the correlation value is the ratio of the intensities of the signals S11 and S12.

The processor 43 acquires, as the feature quantity, a difference value D21 (=d2−d1) between the difference value d1 at the time point t1 and the difference value d2 at the time point t2. The difference value d1 is an example of the first correlation value that is obtained when the pressurizing operation by the pressurization device 30 is started. The difference value d2 is an example of the first correlation value that is obtained when the pressurizing operation by the pressurization device 30 is canceled. The difference value D21 is an example of the second correlation value.

The ratio of the intensities of the signals S11 and S12 may be acquired as another example of the first correlation value. In this case, the difference value between the ratios at the time points t1 and t2 is acquired as another example of the second correlation value.

The difference value D21 reflects the anemic state of the subject. In a patient in whom intraperitoneal bleeding occurs, for example, decreasing of the hemoglobin concentration (anemia) appears as a clinical symptom. In this case, the intensity of the signal S11 is increased, and the difference value D21 is accordingly decreased. In the case where anemic symptom is significant, the difference value D21 may have a negative value.

The processor 43 outputs a notification signal S3 corresponding to the difference value D21 from the output interface 42. The notifier 49 may perform a notification based on the notification signal S3. The notification is performed by using at least one of visual notification, audible notification, and haptic notification. For example, an index indicating the difference value D21 may be displayed on the display device. Alternatively, in the case where the difference value D21 is less than a prescribed threshold, an adequate index or alarm sound may be displayed or outputted. The notification based on the notification signal S3 may be performed by an apparatus that is remote from the medical photometer 40. In this case, the notification signal S3 is transmitted to the remote apparatus through the output interface 42.

According to the above configuration, the user can estimate intraperitoneal bleeding of the subject, through a notification based on the difference value D21. Intraperitoneal bleeding is an example of the disease state.

In place of the output of the notification signal S3 corresponding to the difference value D21, the processor 43 may output a notification signal S4 corresponding to a result of estimation of intraperitoneal bleeding. In this case, the processor 43 is configured to, when the difference value D21 is less than the prescribed threshold, estimate intraperitoneal bleeding of the subject.

The notifier 49 may perform a notification based on the notification signal S4. The notification based on the notification signal S4 is performed by using at least one of visual notification, audible notification, and haptic notification. For example, an adequate index or alarm sound indicating that intraperitoneal bleeding is estimated may be displayed or outputted. The notification based on the notification signal S4 may be performed by an apparatus that is remote from the medical photometer 40. In this case, the notification signal S4 is transmitted to the remote apparatus through the output interface 42.

Example 3: Estimation of Disease State where Oxygenation State of Capillary Vascular Bed is Depressed In this example, the photo emitter 10 includes a light source that emits a red light beam. The wavelength of the red light beam is determined such that the difference between the absorbance of oxygenated hemoglobin in blood and the absorbance of deoxygenated hemoglobin is more than a prescribed value. In other words, a wavelength at which the absorbance is easily affected by a change of the oxygenation state is selected. Examples of such a wavelength of the red light beam include 660 nm.

The processor 43 outputs a control signal S2 that causes the photo emitter 10 to emit the red light beam, from the output interface 42. The photo detector 20 outputs a signal S1 corresponding to the quantity of the red light beam that has passed through the living tissue. The input interface 41 receives the signal S1.

Figure 3:
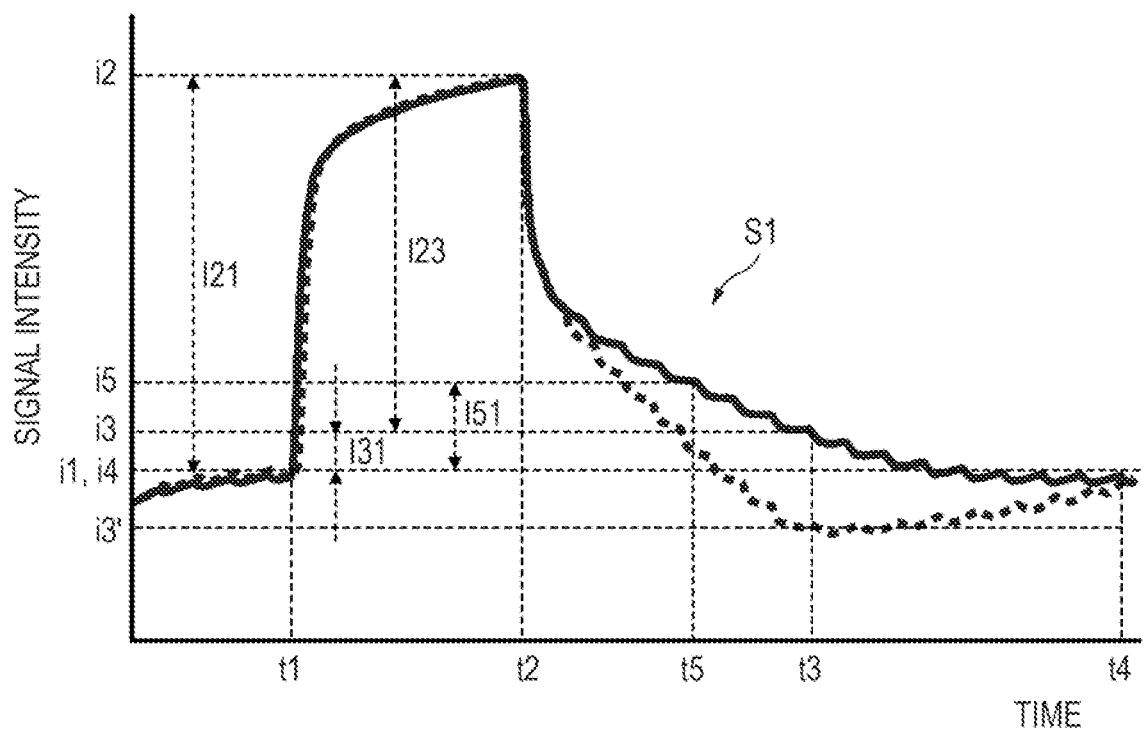
FIG. 3 illustrates an exemplary operation of the medical photometer.

The processor 43 acquires a temporal change of the intensity of the signal S1 while causing the pressurization controller 44 to control the pressurizing operation performed by the pressurization device 30. FIG. 3 illustrates the temporal change of the intensity of the signal S1 that is acquired as described above.

The reference symbol t1 indicates a time point when the pressurizing operation performed by the pressurization device 30 is started. In accordance with the pressurization, the thickness of the living tissue is reduced, and blood is eliminated. In the photo detector 20, the quantity of the received red light beam is accordingly increased. The intensity of the signal S1 is increased as well.

The reference symbol t2 indicates a time point when the pressurizing operation performed by the pressurization device 30 is canceled. In accordance with the cancellation of the pressurization, the thickness of the living tissue is recovered, and the eliminated blood returns. In the photo detector 20, the quantity of the received red light beam is accordingly decreased. The intensity of the signal S1 is decreased as well.

The reference symbol t3 indicates a time point when a change amount of the intensity of the signal S1 per a prescribed time period reaches a prescribed threshold after the cancellation of the pressurization.

At the time point t4 that is after the time point t3, the intensity of the signal S1 reaches the steady state in which no temporal change thereof is substantially observed. The reference symbol i4 indicates the intensity of the signal S1 that is in the steady state. The processor 43 acquires, as the feature quantity, a difference value I31 (=i3−i1) between the intensity i1 of the signal S1 at the time point t1 and the intensity i3 of the signal S1 at the time point t3. The intensity i1 is an example of the intensity that is obtained before the pressurizing operation is performed by the pressurization device 30. The intensity i3 is an example of the intensity that is obtained after the pressurizing operation performed by the pressurization device 30 is canceled. The difference value I31 is an example of the correlation value. Another example of the correlation value is the ratio of the intensities i1 and i3.

The difference value I31 reflects the oxygenation state of the blood that is eliminated from the living tissue by the pressurization. In a patient with sepsis, for example, a shunt blood flow that flows from an artery to a vein without passing through a capillary vascular bed occurs. When a shunt blood flow occurs, amounts of blood and oxygen that are supplied to the living tissue including the capillary vascular bed are reduced, whereby the blood oxygen saturation of the capillary vascular bed is decreased. In this case, a red light beam is largely absorbed, and the intensity i1 is accordingly decreased. On the other hand, after the pressurizing operation is canceled, the arterial blood with a high oxygen saturation flows into the capillary vascular bed, whereby the oxygen saturation of the capillary vascular bed that is obtained immediately after the cancellation of the pressurization is increased from the oxygen saturation of the capillary vascular bed that is obtained before the pressurization. At this time, the red light beam is less absorbed. Accordingly, the intensity i3 at the time point t3 is increased, whereby the difference value I31 is increased.

The processor 43 outputs a notification signal S3 corresponding to the difference value I31 from the output interface 42. The notifier 49 may perform a notification based on the notification signal S3. The notification based on the notification signal S3 is performed by using at least one of visual notification, audible notification, and haptic notification. For example, an index indicating the difference value I31 may be displayed on the display device. Alternatively, in the case where the difference value I31 is less than a prescribed threshold, an adequate index or an alarm sound may be displayed or outputted. The notification based on the notification signal S3 may be performed by an apparatus that is remote from the medical photometer 40. In this case, the notification signal S3 is transmitted to the remote apparatus through the output interface 42.

According to the above configuration, the user can estimate that the subject is in a disease state where the oxygenation state of the capillary vascular bed is depressed, through the notification based on the difference value I31. As described above, sepsis is an example of such a disease state.

In place of the output of the notification signal S3 corresponding to the difference value I31, the processor 43 may output a notification signal S4 corresponding to a result of estimation of a disease state where the oxygenation state of the capillary vascular bed is depressed. In this case, the processor 43 is configured to, when the difference value I31 is less than the prescribed threshold, estimate that the subject is in a disease state where the oxygenation state of the capillary vascular bed is depressed.

The notifier 49 may perform a notification based on the notification signal S4. The notification based on the notification signal S4 is performed by using at least one of visual notification, audible notification, and haptic notification. For example, an adequate index or alarm sound indicating that sepsis is estimated may be displayed or outputted. The notification based on the notification signal S4 may be performed by an apparatus that is remote from the medical photometer 40. In this case, the notification signal S4 is transmitted to the remote apparatus through the output interface 42.

As illustrated in FIG. 3, a time point t5 may be defined as required. The time point t5 is a time point when the intensity of the signal S1 is recovered to a prescribed proportion to a difference value I23 (=i2−i3) between the intensity i2 and the intensity i3. Namely, the intensity i5 at the time point t5 is determined as a value that is obtained by adding a value which is found by multiplying the difference value I23 by the prescribed proportion, to the intensity i3. For example, the prescribed proportion is 0.1. In this case, a difference value I51 (=i5−i1) between the intensity i5 and the intensity i1 or the like may be defined as required as a new feature quantity.

Example 4: Estimation of Edema

In this example, the photo emitter 10 includes a light source that emits an infrared light beam. The wavelength of the infrared light beam is determined such that the absorbance of water is higher than the absorbance of hemoglobin. Examples of such a wavelength of the infrared light beam include 1,300 nm.

The processor 43 outputs a control signal S2 that causes the photo emitter 10 to emit a near-infrared light beam, from the output interface 42. The photo detector 20 outputs a signal S1 corresponding to the quantity of a red light beam that has passed through the living tissue. The input interface 41 receives the signal S1.

The processor 43 acquires a temporal change of the intensity of the signal S1 while causing the pressurization controller 44 to control the pressurizing operation performed by the pressurization device 30. In accordance with the pressurization, the thickness of the living tissue is reduced, whereby the cellular interstitial fluid is eliminated. In the photo detector 20, the quantity of the received infrared light beam is accordingly increased. The intensity of the signal S1 is increased as well. In accordance with the cancellation of the pressurization, the thickness of the living tissue is recovered, whereby the eliminated cellular interstitial fluid returns. In the photo detector 20, the quantity of the received infrared light beam is accordingly decreased. The intensity of the signal S1 is decreased as well. As a result, the temporal change of the intensity of the signal S1 is as illustrated in FIG. 3.

The processor 43 acquires, as the feature quantity, a difference value I31 (=i3−i1) between the intensity i1 of the signal S1 at the time point t1 and the intensity i3 of the signal S1 at the time point t3. The intensity i1 is an example of the intensity that is obtained before the pressurizing operation is performed by the pressurization device 30. The intensity i3 is an example of the intensity that is obtained after the pressurizing operation performed by the pressurization device 30 is canceled. The difference value I31 is an example of the correlation value. Another example of the correlation value is the ratio of the intensities i1 and i3.

The difference value I31 may be used for estimating edema. In a patient with edema, water is excessively reserved in the cellular interstitium. The water that has been eliminated by the pressurizing operation requires a long time to refill the cellular interstitium. Even after the pressurizing operation is cancelled, therefore, the state where the thickness of the living tissue is reduced is continued. In this case, the intensity i3 is increased, whereby the difference value I31 is increased.

The processor 43 outputs a notification signal S3 corresponding to the difference value I31 from the output interface 42. The notifier 49 may perform a notification based on the notification signal S3. The notification based on the notification signal S3 is performed by using at least one of visual notification, audible notification, and haptic notification. For example, an index indicating the difference value I31 may be displayed on the display device. Alternatively, in the case where the difference value I31 is less than a prescribed threshold, an adequate index or alarm sound may be displayed or outputted. The notification based on the notification signal S3 may be performed by an apparatus that is remote from the medical photometer 40. In this case, the notification signal S3 is transmitted to the remote apparatus through the output interface 42.

According to the above configuration, the user can estimate that the subject experiences edema, through the notification based on the difference value I31. Edema is an example of the disease state.

In place of the output of the notification signal S3 corresponding to the difference value I31, the processor 43 may output a notification signal S4 corresponding to a result of estimation of edema. In this case, the processor 43 is configured to, when the difference value I31 is less than the prescribed threshold, estimate that the subject experiences edema.

The notifier 49 may perform a notification based on the notification signal S4. The notification based on the notification signal S4 is performed by using at least one of visual notification, audible notification, and haptic notification. For example, an adequate index or alarm sound indicating that edema is estimated may be displayed or outputted. The notification based on the notification signal S4 may be performed by an apparatus that is remote from the medical photometer 40. In this case, the notification signal S4 is transmitted to the remote apparatus through the output interface 42.

In addition to or in place of the difference value I31, the processor 43 may acquire, as the feature quantity, an area under waveform Au at a temporal change of the intensity of the signal S1 after the time point t2 when the pressurizing operation is cancelled. Specifically, the area under waveform Au is expressed by following expression with respect to the temporal change i(t) of the intensity of the signal S1.

$$Au = \int_{t2}^{t4} |i(t) - i4| dt \quad \text{[Math. 1]}$$

According to increase of the blood flow, for example, there is a case where the signal intensity i3 is less than the signal intensity i4. At this time, the area under waveform Au is expressed by following expression.

$$Au = \int_{t2}^{t4} |i(t) - i3| dt \quad \text{[Math. 2]}$$

Also the area under waveform Au may be used for estimating edema. In a patient with edema, water is excessively reserved in the cellular interstitium. The water that has been eliminated by the pressurizing operation requires a relatively long time to refill the cellular interstitium. Therefore, the area under waveform Au is increased. In the case where the area under waveform Au is larger than a prescribed threshold, it is estimated that the subject experiences edema.

Example 5: Estimation of Vascular State and Vascular Reactivity

In this example, the photo emitter 10 includes a light source that emits an infrared light beam. The wavelength of the infrared light beam is determined such that the difference between the absorbance of oxygenated hemoglobin in blood and the absorbance of deoxygenated hemoglobin is less than a prescribed value. In other words, a wavelength at which the absorbance is hardly affected by a change of the oxygenation state is selected. Examples of such a wavelength of a red light beam include 805 nm and 940 nm.

The processor 43 outputs a control signal S2 that causes the photo emitter 10 to emit an infrared light beam, from the output interface 42. The photo detector 20 outputs a signal S1 corresponding to the quantity of the infrared light beam that has passed through the living tissue. The input interface 41 receives the signal S1.

The processor 43 acquires a temporal change of the intensity of the signal S1 while causing the pressurization controller 44 to control the pressurizing operation performed by the pressurization device 30. As a result, the temporal change of the intensity of the signal S1 that is acquired as described above is as illustrated in FIG. 3.

The processor 43 acquires, as the feature quantity, a difference value I31 (=i3−i1) between the intensity i1 of the signal S1 at the time point t1 and the intensity i3 of the signal S1 at the time point t3. The intensity it is an example of the intensity that is obtained before the pressurizing operation is performed by the pressurization device 30. The intensity i3 is an example of the intensity that is obtained after the pressurizing operation performed by the pressurization device 30 is canceled. The difference value I31 is an example of the correlation value. Another example of the correlation value is the ratio of the intensities i1 and i3.

When the blood flow is temporarily stopped and then restarted, the blood vessel is expanded by a reaction of the vascular endothelium, whereby the blood flow becomes larger than that before being stopped. This phenomenon is known as the reactive hyperemia. As a diagnosis method in which the vascular endothelium function is diagnosed by using the physiological stimulus responsiveness, the flow-mediated vasodilation (FMD) test is known. In the test, in a case where the increasing amount of the vascular diameter is less than the normal range, it is suggested that the disease is in a state where the vascular endothelium function is degraded. The above-described phenomenon may be induced by the pressurizing operation performed by the pressurization device 30 and the cancellation thereof. When the pressurization is canceled and the blood flow is increased to be larger than that before the pressurization, the intensity i3 is decreased, whereby the difference value I31 is decreased. In a case where the increase of the blood flow is extremely large, the difference value I31 may have a negative value. In FIG. 3, the signal intensity in the case where the difference value I31 has a negative value is illustrated by a reference symbol i3'.

The processor 43 outputs a notification signal S3 corresponding to the difference value I31 from the output interface 42. The notifier 49 may perform a notification based on the notification signal S3. The notification based on the notification signal S3 is performed by using at least one of visual notification, audible notification, and haptic notification. For example, an index indicating the difference value I31 may be displayed on the display device. Alternatively, in the case where the difference value I31 is less than a prescribed threshold, an adequate index or alarm sound indicating that the vascular endothelium function is degraded may be displayed or outputted. The notification based on the notification signal S3 may be performed by an apparatus that is remote from the medical photometer 40. In this case, the notification signal S4 is transmitted to the remote apparatus through the output interface 42.

According to the above configuration, the user can estimate the vascular endothelium function of the subject through a notification based on the difference value I31. The vascular endothelium function is an example of the physiological state of the living tissue.

In place of the output of the notification signal S3 corresponding to the difference value I31, the processor 43 may output a notification signal S4 corresponding to a result of estimation of a disease state in which the vascular endothelium function is degraded. In this case, the processor 43 is configured to, when the difference value I31 is less than the prescribed threshold, estimate that the subject is in the disease state in which the vascular endothelium function is degraded.

The notifier 49 may perform a notification based on the notification signal S4. The notification based on the notification signal S4 is performed by using at least one of visual notification, audible notification, and haptic notification. For example, an adequate index or alarm sound indicating that lowering of the vascular endothelium function is estimated may be displayed or outputted. The notification based on the notification signal S4 may be performed by an apparatus that is remote from the medical photometer 40. In this case, the notification signal S4 is transmitted to the remote apparatus through the output interface 42.

Similarly to Example 4, in addition to or in place of the difference value I31, the processor 43 may acquire, as the feature quantity, an area under waveform Au at a temporal change of the intensity of the signal S1 after the time point t2 when the pressurizing operation is cancelled.

Also the area under waveform Au may be used for estimating the vascular state and the vascular reactivity. As described above, when, after the cancellation of the pressurization, the blood flow is increased by the reactive hyperemia, the intensity i3 is decreased. As illustrated in FIG. 3, the area under waveform is accordingly increased. In a case where the area under waveform is larger than a prescribed threshold, it may be estimated that the subject is in the disease state in which the vascular endothelium function is degraded.

Figure 4A:
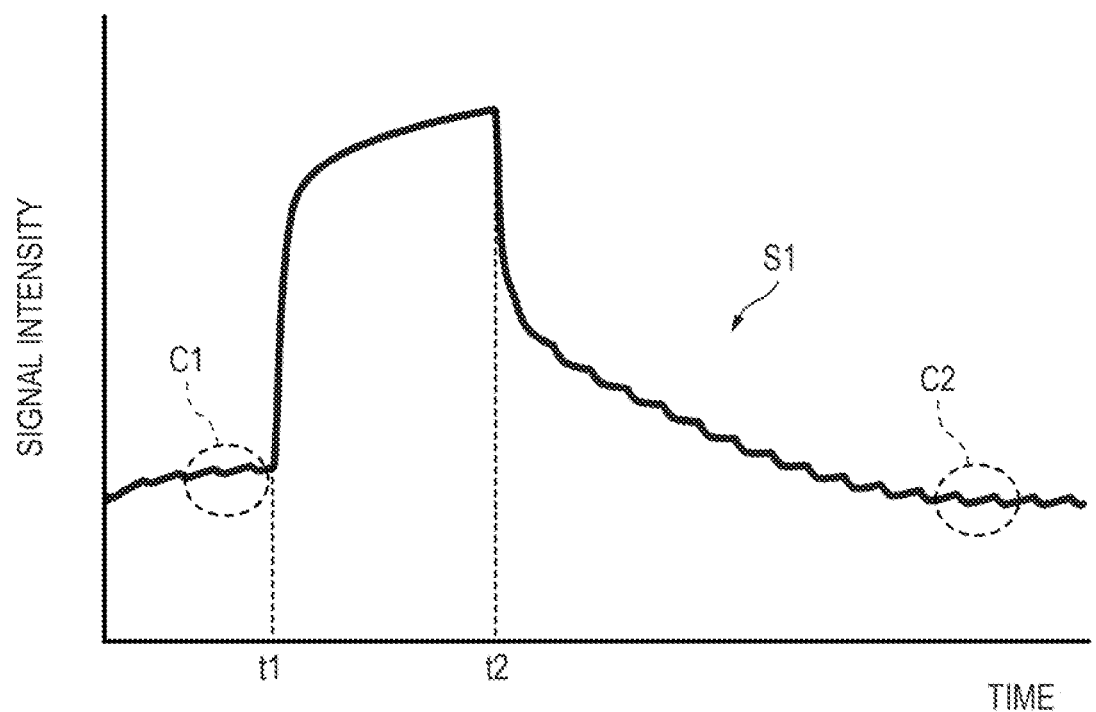
FIG. 4A illustrates an exemplary operation of the medical photometer.
Figure 4B:
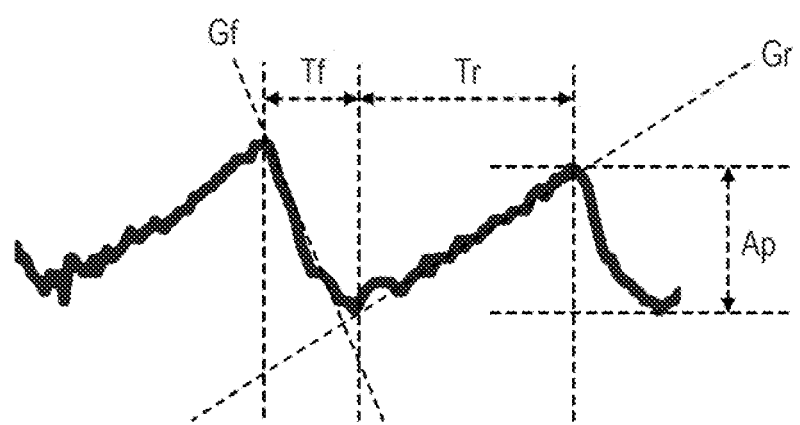
FIG. 4B illustrates an exemplary operation of the medical photometer.

As illustrated in FIG. 4A, a waveform corresponding to the pulse wave of the subject is superimposed on the signal S1. FIG. 4B illustrates the waveform in an enlarged manner. In the following description, the waveform is referred to as "pulse wave" for the sake of convenience. As illustrated in FIG. 4B, a plurality of waveform factors are defined with respect to the pulse wave.

Ap: amplitude (the difference between the maximum and minimum values of the signal intensity)
Tf: falling time (the time period from a time point when the signal intensity has the maximum value, to that when the signal intensity has the minimum value)
Gf: falling gradient (=A/Tf)
Tr: rising time (the time period from the time point when the signal intensity has the minimum value, to that when the signal intensity has the maximum value)
Gr: rising gradient (=A/Tr)

As the value corresponding to the amplitude A, a statistic value such as the root mean square error (RMSE), Euclidean distance, mean square error (MSE), or standard deviation (SD) of the intensity value of the signal S1 during a prescribed time period may be used.

In addition to or in place of the difference value I31, the processor 43 may acquire, as the feature quantity, a correlation value between the waveform factor of the pulse wave that is superimposed on the signal S1 before the pressurizing operation is performed and the waveform factor of the pulse wave that is superimposed on the signal S1 after the pressurizing operation is canceled. An example of the correlation value is a difference value or a ratio between them.

The pulse wave is superimposed on the signal S1 before the pressurizing operation is performed as the region that is surrounded by the dashed lines C1 in FIG. 4A. The plurality of above-described waveform factors in the pulse wave will be hereinafter indicated as the amplitude Ap1, the falling time Tf1, the falling gradient Gf1, the rising time Tr1, and the rising gradient Gr1. The pulse wave is superimposed on the signal S1 after the pressurizing operation is canceled as the region that is surrounded by the dashed lines C2 in FIG. 4A. The plurality of above-described waveform factors in the pulse wave will be hereinafter indicated as the amplitude Ap2, the falling time Tf2, the falling gradient Gf2, the rising time Tr2, and the rising gradient Gr2.

The processor 43 acquires a correlation value with respect to waveform factors of the same kind. When attention is paid to the amplitude Ap, for example, the processor 43 acquires a difference value (Ap1−Ap2) or the ratio (Ap1/Ap2) as the feature quantity. Similarly, the difference value (Tf1−Tf2) or the ratio (Tf1/Tf2), the difference value (Gf1−Gf2) or the ratio (Gf1/Gf2), the difference value (Tr1−Tr2) or the ratio (Tr1/Tr2), and the difference value (Gr1−Gr2) or the ratio (Gr1/Gr2) may be acquired.

It is known that the shape of a pulse wave is changed by the blood pressure, the blood flow amount, the vascular resistance, or the like, as a Windkessel model. Hence, the feature quantity based on the waveform factors of the pulse wave reflects the vascular state of the subject and the vascular reactivity to a physiological stimulus. Other examples of such waveform factors include the percentile, the kurtosis, the skewness, and the like. Therefore, the user can estimate the vascular state of the subject and the vascular reactivity to a physiological stimulus, through a notification based on the correlation value. The vascular state and the vascular reactivity to a physiological stimulus are examples of the physiological state of the living tissue.

Example 6: Estimation of Sign of Shock Involving Hypotension

In this example, the photo emitter 10 includes a light source that emits an infrared light beam. The wavelength of the infrared light beam is determined such that the difference between the absorbance of oxygenated hemoglobin in blood and the absorbance of deoxygenated hemoglobin is less than a prescribed value. In other words, a wavelength at which the absorbance is hardly affected by a change of the oxygenation state is selected. Examples of such a wavelength of a red light beam include 805 nm and 940 nm.

The processor 43 outputs a control signal S2 that causes the photo emitter 10 to emit an infrared light beam, from the output interface 42. The photo detector 20 outputs a signal S1 corresponding to the quantity of the infrared light beam that has passed through the living tissue. The input interface 41 receives the signal S1.

The processor 43 acquires a temporal change of the intensity of the signal S1 while causing the pressurization controller 44 to control the pressurizing operation performed by the pressurization device 30. As a result, the temporal change of the intensity of the signal S1 that is acquired as described above is as illustrated in FIG. 5. With respect to the temporal change, the five kinds of time periods and five kinds of gradients that are listed below may be defined.

When the pressurizing operation is started at the time point t1, the intensity of the signal S1 is rapidly increased. Accordingly, the differential value of the intensity of the signal S1 is rapidly increased as well. Thereafter, the increase of the intensity of the signal S1 is gradually mitigated. Consequently, the differential value of the intensity of the signal S1 turns to decline. The time period from the time point t1 when the pressurizing operation is started, to the time point when the differential value is less than a prescribed threshold Th1 is defined as a first time period T1. The change amount of the intensity of the signal S1 during the first time period T1 is defined as a first gradient G1. The first time period T1 is an example of the prescribed time period.

The time period from the time point when the first time period T1 ends, to the time point t2 when the pressurizing operation is cancelled is defined as a second time period T2. The change amount of the intensity of the signal S1 during the second time period T2 is defined as a second gradient G2. The second time period T2 is an example of the prescribed time period.

In other words, the first time period T1 is a time period when the change amount of the intensity of the signal S1 during the pressurizing operation is relatively large. The second time period T2 is a time period when the change amount of the intensity of the signal S1 during the pressurizing operation is relatively small.

When the pressurizing operation is cancelled, the intensity of the signal S1 is rapidly decreased. Accordingly, the differential value of the intensity of the signal S1 is rapidly decreased as well. Thereafter, the decrease of the intensity of the signal S1 is gradually mitigated. Consequently, the differential value of the intensity of the signal S1 turns to ascend. The time period from the time point t2 when the pressurizing operation is cancelled, to the time point when the differential value is larger than a prescribed threshold Th3 is defined as a third time period T3. The change amount of the intensity of the signal S1 during the third time period T3 is defined as a third gradient G3. The third time period T3 is an example of the prescribed time period.

The time period from the time point when the third time period T3 ends, to the time point t3 is defined as a fourth time period T4. As described above, the time point t3 is the time point when the change amount of the intensity of the signal S1 per a prescribed time period reaches the prescribed threshold after the cancellation of the pressurizing operation. The change amount of the intensity of the signal S1 during the fourth time period T4 is defined as a fourth gradient G4. The fourth time period T4 is an example of the prescribed time period.

In other words, the third time period T3 is a time period when the change amount of the intensity of the signal S1 after the cancellation of the pressurizing operation is relatively large. The fourth time period T4 is a time period when the change amount of the intensity of the signal S1 after the cancellation of the pressurizing operation is relatively small.

The time period from the time point t3 to the time point t4 is defined as a fifth time period T5. The change amount of the intensity of the signal S1 during the fifth time period T5 is defined as a fifth gradient G5. The fifth time period T5 is an example of the prescribed time period.

Each of the first gradient G1, the second gradient G2, the third gradient G3, the fourth gradient G4, and the fifth gradient G5 is acquired by a fitting process that uses the least square method or the like, and that is for a linear function. However, the function of the fitting may be an exponential function or a power function. In the case where the fitting process is performed on the exponential function, the feature quantity to be acquired is a time constant. In the case where the fitting process is performed on the power function, the feature quantity to be acquired is a coefficient of each term.

The processor 43 acquires the fourth gradient G4 as the feature quantity. The fourth gradient G4 is an example of the change amount of the intensity of the infrared light beam per a prescribed time period after the cancellation of the pressurizing operation.

The fourth gradient G4 may be used in estimation of a sign of shock involving hypotension. Prior to occurrence of a rapid hypotension, autonomous adjustment of the hemodynamics in which the blood pressure is maintained by causing peripheral vessels to constrict to raise the peripheral vascular resistance is performed. When the autonomous adjustment function cannot be maintained, the blood pressure suddenly drops to bring a subject into a shock state. When peripheral vessels constrict, the blood slowly returns after the cancellation of the pressurizing operation, whereby the intensity of the signal S1 slowly recovers, and the value of the fourth gradient G4 is increased (the negative gradient is decreased).

The processor 43 outputs a notification signal S3 corresponding to the fourth gradient G4 from the output interface 42. The notifier 49 may perform a notification based on the notification signal S3. The notification based on the notification signal S3 is performed by using at least one of visual notification, audible notification, and haptic notification. For example, an index indicating the fourth gradient G4 may be displayed on the display device. Alternatively, in a case where the fourth gradient G4 is larger than a prescribed threshold, an adequate index or alarm sound may be displayed or outputted. The notification based on the notification signal S3 may be performed by an apparatus that is remote from the medical photometer 40. In this case, the notification signal S3 is transmitted to the remote apparatus through the output interface 42.

According to the above configuration, the user can estimate a sign of shock involving hypotension of the subject, through a notification based on the fourth gradient G4. A sign of shock involving hypotension is an example of the disease state.

In place of the output of the notification signal S3 corresponding to the fourth gradient G4, the processor 43 may output a notification signal S4 corresponding to a result of estimation of a sign of shock involving hypotension. In this case, the processor 43 is configured to, when the fourth gradient G4 is less than the prescribed threshold, estimate a sign of shock involving hypotension of the subject.

The notifier 49 may perform the notification based on the notification signal S4. The notification based on the notification signal S4 is performed by using at least one of visual notification, audible notification, and haptic notification. For example, an adequate index or alarm sound indicating that a sign of shock involving hypotension is estimated may be displayed or outputted. The notification based on the notification signal S4 may be performed by an apparatus that is remote from the medical photometer 40. In this case, the notification signal S4 is transmitted to the remote apparatus through the output interface 42.

Example 7: Estimation of Oxygen Metabolism Condition in Living Tissue

In this example, the photo emitter 10 includes a first light source that emits a red light beam, and a second light source that emits an infrared light beam. The wavelengths of the red and infrared light beams are determined such that the absorbances of hemoglobin in blood are different from each other. Examples of such a wavelength of the red light beam include 660 nm. Examples of such a wavelength of the infrared light beam include 940 nm.

The processor 43 outputs a control signal S2 that causes the photo emitter 10 to alternately emit the red and infrared light beams, from the output interface 42. The photo detector 20 alternately outputs a signal S11 corresponding to the quantity of the red light beam that has passed through the living tissue, and the signal S12 corresponding to the quantity of the infrared light beam that has passed through the living tissue. The input interface 41 alternately receives the signal S11 and the signal S12. The processor 43 acquires a temporal change of the intensity of the signal S11, and that of the intensity of the signal S12 while causing the pressurization controller 44 to control the pressurizing operation performed by the pressurization device 30.

Similarly to Example 1, the processor 43 acquires a difference value between the intensities of the signals S11 and S12. As a result, a temporal change of the difference value is as illustrated in FIG. 2B. After the pressurizing operation is cancelled, the difference value reaches the steady state in which no temporal change thereof is substantially observed. The reference symbol d4 indicates the difference value in the steady state. The difference value between the intensities of the signals S11 and S12 is an example of the correlation value. Another example of the correlation value is the ratio of the intensities of the signals S11 and S12.

In FIG. 2B, the reference symbol t3 indicates a time point when a change amount of the intensity of the signal S1 per a prescribed time period reaches a prescribed threshold after the cancellation of the pressurizing operation. The reference symbol t4 indicates a time point when the temporal change of the signal S1 reaches the steady state.

The processor 43 acquires the fifth gradient G5 in the temporal change of the difference value, as the feature quantity. The definition of the fifth gradient G5 described with reference to FIG. 5 can be applied to the fifth gradient G5 in FIG. 2B as well. Namely, the fifth gradient G5 is defined as the change amount of the difference value that is obtained between the time points t3 and t4. The fifth gradient G5 is an example of the change amount of the difference value per a prescribed time period after the cancellation of the pressurizing operation.

The fifth gradient G5 may be used in estimation of an oxygen metabolism condition in a living tissue of a subject. The state where the temporal change of the difference value reaches the steady state as illustrated in FIG. 2B corresponds to a state where the supply and consumption of oxygen are balanced. In other words, in a living tissue in which the supply and consumption of oxygen are balanced, a time period that elapses before reaching to the steady state is short, whereby the value of the fifth gradient G5 is decreased (the negative gradient is increased). In the living tissue of a normal subject, for example, oxygen in blood that flows into the living tissue in which the pressurizing operation is cancelled is actively consumed, whereby the blood oxygen saturation decreases. On the other hand, blood with high oxygen saturation flows smoothly into the living tissue, whereby the blood oxygen saturation increases. As the balance between them is quickly achieved, the value of the fifth gradient G5 is decreased.

The processor 43 outputs a notification signal S3 corresponding to the fifth gradient G5 from the output interface 42. The notifier 49 may perform a notification based on the notification signal S3. The notification based on the notification signal S3 is performed by using at least one of visual notification, audible notification, and haptic notification. For example, an index indicating the fifth gradient G5 may be displayed on the display device. Alternatively, in a case where the fifth gradient G5 is larger than a prescribed threshold (the negative gradient is gentle), an adequate index or alarm sound indicating that the oxygen metabolism condition is not good (the balance between the supply and consumption of oxygen is not achieved) may be displayed or outputted. The notification based on the notification signal S3 may be performed by an apparatus that is remote from the medical photometer 40. In this case, the notification signal S3 is transmitted to the remote apparatus through the output interface 42.

According to the above configuration, the user can estimate the oxygen metabolism condition in the capillary vascular bed of the subject, through a notification based on the fifth gradient G5. The oxygen metabolism condition in the capillary vascular bed is an example of the physiological state of the living tissue.

In place of the output of the notification signal S3 corresponding to the fifth gradient G5, the processor 43 may output a notification signal S4 corresponding to a result of estimation of the oxygen metabolism condition in the capillary vascular bed. In this case, the processor 43 is configured to, when the fifth gradient G5 is larger than the prescribed threshold (the negative gradient is gentle), estimate that the oxygen metabolism condition in the capillary vascular bed of the subject is not good.

The notifier 49 may perform a notification based on the notification signal S4. The notification based on the notification signal S4 is performed by using at least one of visual notification, audible notification, and haptic notification. The notification based on the notification signal S4 may be performed by an apparatus that is remote from the medical photometer 40. In this case, the notification signal S4 is transmitted to the remote apparatus through the output interface 42.

In this example, the photo emitter 10 may be configured to include a light source that emits only a red light beam. In this case, the wavelength of the red light beam is determined such that a difference between the absorbance of oxygenated hemoglobin in blood and absorbance of deoxygenated hemoglobin is larger than a prescribed value. In other words, a wavelength at which the absorbance is easily affected by a change of the oxygenation state is selected. Examples of such a wavelength of the red light beam include 660 nm.

Examples of the situation where the oxygen metabolism condition is not good include a symptom in the progression process of sepsis. In a case where the patient develops sepsis, a symptom called warm shock first appears, a symptom called cold shock then appears. It is thereafter transferred to a symptom called an anaerobic metabolism. In the warm shock condition, the artery expands, and the peripheral vascular resistance is decreased, whereby the cardiac output is increased, and the four limbs are warmed. In cold shock condition, circulatory insufficiency due to coldness of the limbs and blood pressure lowering occurs. In this condition, the expandability of peripheral vessels is degraded, whereby the cardiac output is decreased. In the living tissue in the normal state, the life activity is maintained by an aerobic metabolism in which mitochondria consume oxygen to produce energy and carbon dioxide. In a case where oxygen is not sufficiently supplied to the tissue because of peripheral circulatory insufficiency, however, an anaerobic metabolism in which energy is produced without consuming oxygen is temporarily performed in order to maintain the life activity.

In addition to the above-described fifth gradient G5, the fourth gradient G4 in FIG. 2B is acquired as the feature quantity, thereby estimation of an aerobic metabolism and anaerobic metabolism in a patient with sepsis is enabled. The definition of the fourth gradient G4 described with reference to FIG. 5 can be applied to the fourth gradient G4 in FIG. 2B as well. Namely, the fourth gradient G4 is defined as a change mount of the difference value that is obtained between the time points t2 and t3. The fourth gradient G4 is an example of the change amount of the difference value per a prescribed time period after the cancellation of the pressurizing operation.

In the case of a patient with sepsis, peripheral vessels constrict, whereby the blood slowly returns after the cancellation of the pressurizing operation. Accordingly, the recovery of the difference value is delayed, whereby the value of the fourth gradient G4 is increased (the negative gradient is decreased).

In cold shock condition, relatively small amount of oxygen is supplied because of insufficiency of the blood flow, whereas relatively large amount of oxygen is consumed because of an aerobic metabolism. Accordingly, establishment of balance between the supply and consumption of oxygen after the cancellation of the pressurizing operation tends to be delayed. In other words, the value of the fifth gradient G5 is increased (the negative gradient is decreased). In an anaerobic metabolism condition, on the other hand, not only relatively small amount of oxygen is supplied because of insufficiency of the blood flow, but also relatively small amount of oxygen is consumed. Accordingly, the supply and consumption of oxygen after the cancellation of the pressurizing operation are balanced relatively quickly. In other words, the value of the fifth gradient G5 is decreased (the negative gradient is increased).

In view of the above, when the value of the fourth gradient G4 is less than a prescribed threshold, and the value of the fifth gradient G5 is less than a prescribed threshold, it may be estimated that the subject is normal, and the oxygen metabolism condition in the capillary vascular bed is good. When the value of the fourth gradient G4 is no less than the prescribed threshold, but the value of the fifth gradient G5 is less than the prescribed threshold, it may be estimated that the subject has sepsis, and the capillary vascular bed is in the anaerobic metabolism condition. When the value of the fourth gradient G4 is no less than the prescribed threshold, and the value of the fifth gradient G5 is no less than the prescribed threshold, it may be estimated that the subject has sepsis, and the capillary vascular bed is in the aerobic metabolism condition (i.e., the cold shock condition).

In this case, the above-described notification signal S3 may be configured to correspond to the fourth gradient G4 and the fifth gradient G5. The above-described notification signal S4 may be configured to correspond to a result of estimation of the aerobic and anaerobic metabolism conditions in sepsis. Each of the aerobic and anaerobic metabolism conditions in sepsis is an example of the disease state.

Example 8: Estimation of Edema

In this example, the photo emitter 10 includes a first light source that emits a first infrared light beam, and a second light source that emits a second infrared light beam. The wavelength of the first infrared light beam is determined such that the difference between the absorbance of oxygenated hemoglobin in blood and the absorbance of deoxygenated hemoglobin is less than a prescribed value. In other words, a wavelength at which the absorbance is hardly affected by a change of the oxygenation state is selected. Examples of such a wavelength of the infrared light beam include 805 nm. The wavelength of the second infrared light beam is determined such that the absorbance of water is larger than the absorbance of hemoglobin. Examples of such a wavelength of the second infrared light beam include 1,300 nm.

The processor 43 outputs a control signal S2 that causes the photo emitter 10 to alternately emit the first and second infrared light beams, from the output interface 42. The photo detector 20 alternately outputs a signal S11 corresponding to the quantity of the first infrared light beam that has passed through the living tissue, and the signal S12 corresponding to the quantity of the second infrared light beam that has passed through the living tissue. The input interface 41 alternately receives the signal S11 and the signal S12. The processor 43 acquires a temporal change of the intensity of the signal S11, and that of the intensity of the signal S12 while causing the pressurization controller 44 to control the pressurizing operation performed by the pressurization device 30.

Figure 6:
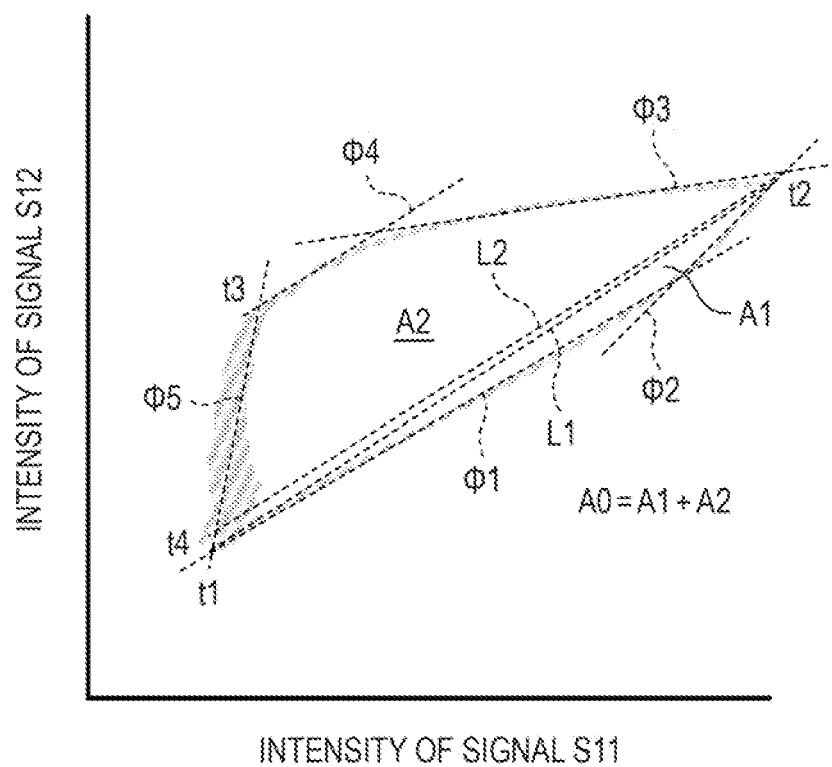
FIG. 6 illustrates an exemplary operation of the medical photometer.

The processor 43 acquires data corresponding to the locus (temporal change) of a point that is specified by the intensity of the signal S11 and that of the signal S12 in a coordinate plane which, as illustrated in FIG. 6, is defined by a first coordinate axis corresponding to the intensity of the signal S11, and a second coordinate axis corresponding to the intensity of the signal S12. As form factors of the locus, a first gradient [Phi] 1, a second gradient [Phi]2, a third gradient [Phi]3, a fourth gradient [Phi]4, a fifth gradient [Phi]5, a first area A1, a second area A2, and a total area A0 may be defined.

Figure 5:
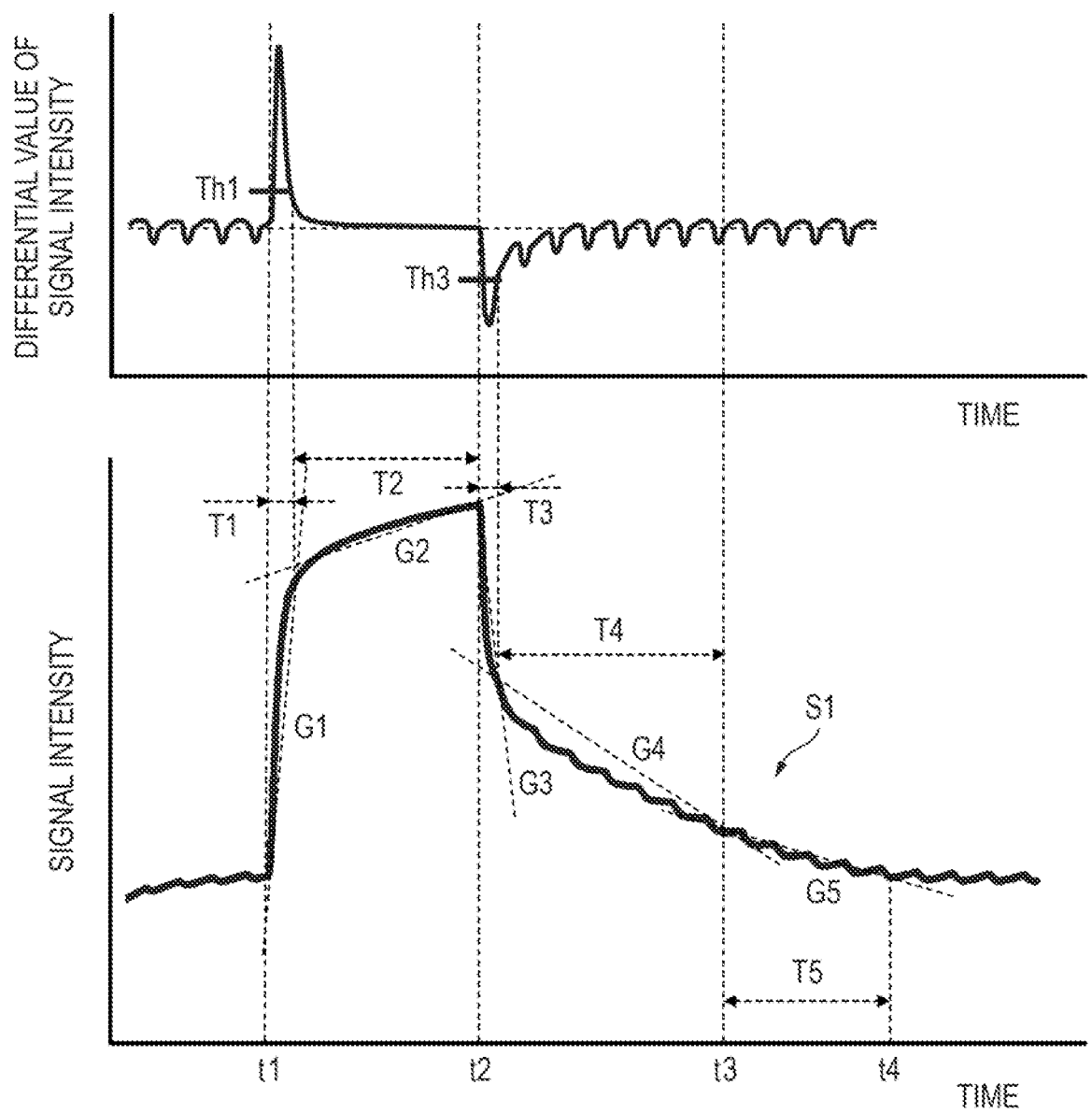
FIG. 5 illustrates an exemplary operation of the medical photometer.

The first gradient [Phi] is defined as a gradient of the locus that is drawn on the coordinate plane of FIG. 6 during the first time period T1 described with reference to FIG. 5. The second gradient [Phi]2 is defined as a gradient of the locus that is drawn on the coordinate plane of FIG. 6 during the second time period T2 described with reference to FIG. 5. The third gradient [phi]3 is defined as a gradient of the locus that is drawn on the coordinate plane of FIG. 6 during the third time period T3 described with reference to FIG. 5. The fourth gradient [phi]4 is defined as a gradient of the locus that is drawn on the coordinate plane of FIG. 6 during the fourth time period T4 described with reference to FIG. 5. The fifth gradient [phi]5 is defined as a gradient of the locus that is drawn on the coordinate plane of FIG. 6 during the fifth time period T5 described with reference to FIG. 5.

Each of the first gradient [phi] 1, the second gradient [phi]2, the third gradient [phi]3, the fourth gradient [phi]4, and the fifth gradient [phi]5 is acquired by a fitting process that uses the least square method or the like, and that is for a linear function. However, the function of the fitting may be an exponential function or a power function. In a case where the fitting process is performed on the exponential function, the feature quantity to be acquired is a time constant. In a case where the fitting process is performed on the power function, the feature quantity to be acquired is a coefficient of each term.

In a case where, in the coordinate plane, a linear line connecting a point that is determined by the intensity of the signal S11 and that of the signal S12 at the time point t1, with a point that is determined by the intensity of the signal S11 and that of the signal S12 at the time point t2 is indicated by L1, the first area A1 represents an area that is surrounded by the locus which is drawn by the point determined by the intensities of the signals S11 and S12 during a time period from the time point t1 to the time point t2, and the linear line L1. In other words, the first area A1 represents an area that is surrounded by the locus which is drawn by the point determined by the intensities of the signals S11 and S12 before the cancellation of the pressurization, and the linear line L1.

Similarly, in a case where a linear line connecting a point that is determined by the intensity of the signal S11 and that of the signal S12 at the time point t2, with a point that is determined by the intensity of the signal S11 and that of the signal S12 at the time point t4 is indicated by L2, the second area A2 represents an area that is surrounded by the locus which is drawn by the point determined by the intensities of the signals S11 and S12 during a time period from the time point t2 to the time point t4, and the linear line L2. In other words, the second area A2 represents an area that is surrounded by the locus which is drawn by the point determined by the intensities of the signals S11 and S12 after the cancellation of the pressurizing operation, and the linear line L2. The total area A0 is defined as the sum of the first area A1 and the second area A2.

The processor 43 acquires at least one of the above form factors as the feature quantity. The feature quantity is used for estimating, for example, edema.

In the case of a patient with edema, water is excessively reserved in the cellular interstitium. The water that has been eliminated by the pressurizing operation requires a relatively long time to refill the cellular interstitium. When the pressurizing operation is cancelled, namely, the eliminated blood by the pressurizing operation first returns to the tissue, and the intensity of the signal S11 that reflects the light absorbing amount of the hemoglobin recovers in advance. Then, water gradually returns into the cellular interstitium, thereby causing the intensity of the signal S12 that reflects the light absorbing amount of the water, to recover. Therefore, a remarkable difference between the subject with edema and the subject without edema is produced particularly with respect to the third gradient [phi]3, the fourth gradient [phi]4, the fifth gradient [phi]5, the second area A2, and the total area A0 that reflect changes of the intensities of the signals S11 and S12 immediately before and after the cancellation of the pressurizing operation. Consequently, the ratio (A2/A1) of the second area A2 to the first area A1, and the ratio (A2/A0) of the second area A2 to the total area A0 may be form factors as well.

The processor 43 outputs a notification signal S3 corresponding to at least one form factor from the output interface 42. The notifier 49 may perform a notification based on the notification signal S3. The notification based on the notification signal S3 is performed by using at least one of visual notification, audible notification, and haptic notification. For example, an index indicating the second area A2 may be displayed on the display device. In a case where the second area A2 is larger than a prescribed threshold, for example, an adequate index or alarm sound may be displayed or outputted. The notification based on the notification signal S3 may be performed by an apparatus that is remote from the medical photometer 40. In this case, the notification signal S3 is transmitted to the remote apparatus through the output interface 42.

In addition to or in place of the notification signal S3 corresponding to at least one form factor, the processor 43 may output, from the output interface 42, a signal for displaying an image including the coordinate plane illustrated in FIG. 6, and the locus of the point that is determined by the intensity of the signal S11 and that of the signal S12. Based on the signal, the image may be displayed on the display device that is disposed in the medical photometer 40, and that is not illustrated, or a display device that is remote from the medical photometer 40.

According to the above configuration, the user can estimate whether a subject experiences edema, through the notification based on at least one of the form factors. Edema is an example of the disease state.

In place of the output of the notification signal S3 corresponding to at least one form factor, the processor 43 may output a notification signal S4 corresponding to a result of estimation of edema. For example, the processor 43 is configured to, when the second area A2 is larger than the prescribed threshold, estimate that the subject experiences edema.

The notifier 49 may perform a notification based on the notification signal S4. The notification based on the notification signal S4 is performed by using at least one of visual notification, audible notification, and haptic notification. For example, an adequate index or alarm sound indicating that edema is estimated may be displayed or outputted. The notification based on the notification signal S4 may be performed by an apparatus that is remote from the medical photometer 40. In this case, the notification signal S4 is transmitted to the remote apparatus through the output interface 42.

Example 9: Estimation of Symptom of Septic Shock

In this example, the photo emitter 10 includes a light source that emits an infrared light beam. The wavelength of the infrared light beam is determined such that the difference between the absorbance of oxygenated hemoglobin in blood and the absorbance of deoxygenated hemoglobin is less than a prescribed value. In other words, a wavelength at which the absorbance is hardly affected by a change of the oxygenation state is selected. Examples of such a wavelength of a red light beam include 805 nm and 940 nm.

The processor 43 outputs a control signal S2 that causes the photo emitter 10 to emit an infrared light beam, from the output interface 42. The photo detector 20 outputs a signal S1 corresponding to the quantity of the infrared light beam that has passed through the living tissue. The input interface 41 receives the signal S1.

The processor 43 acquires a temporal change of the intensity of the signal S1 while causing the pressurization controller 44 to control the pressurizing operation performed by the pressurization device 30. As a result, the temporal change of the intensity of the signal S1 that is acquired as described above is as illustrated in FIG. 5. The processor 43 acquires the value of the fourth gradient G4. The processor 43 repeats the operation to acquire a plurality of values of the fourth gradient G4. The processor 43 acquires changes over time of the fourth gradient G4, as the feature quantity.

In a case where the patient develops sepsis, it is known that, when an administration of an antimicrobial agent is delayed by one hour, the mortality rate is increased by 7%. Therefore, it is important to early find the development of sepsis, and perform therapeutic intervention. However, the sepsis development process rapidly progresses in a complicated manner, and therefore it is known that the symptom of sepsis is difficult to be detected at an early stage.

The changes over time of the fourth gradient G4 may be used in estimation of a symptom of septic shock. In a case where the subject is in the warm shock condition, the arterial blood refill speed after the cancellation of the pressurizing operation is relatively increased. Therefore, the value of the fourth gradient G4 is decreased (the negative gradient is increased). By contrast, in a case where the subject is in the cold shock condition, the arterial blood refill speed after the cancellation of the pressurizing operation is relatively decreased. Therefore, the value of the fourth gradient G4 is increased (the negative gradient is decreased). When the temporal increase/decrease of the value of the fourth gradient G4 that is acquired through a plurality of pressurizing operations is monitored, namely, the progress of the symptom of septic shock can be estimated. The changes over time of the fourth gradient G4 is an example of the temporal change of the change amount of the intensity of an infrared light beam per a prescribed time period after the cancellation of the pressurizing operation.

The processor 43 outputs a notification signal S3 corresponding to the temporal change of the fourth gradient G4 from the output interface 42. The notifier 49 may perform a notification based on the notification signal S3. The notification based on the notification signal S3 is performed by using at least one of visual notification, audible notification, and haptic notification. For example, a graph indicating the temporal change of the fourth gradient G4 may be displayed on the display device. Alternatively, in a case where the value of the fourth gradient G4 is larger or less than a prescribed threshold, an adequate index or alarm sound may be displayed or outputted. The notification based on the notification signal S3 may be performed by an apparatus that is remote from the medical photometer 40. In this case, the notification signal S3 is transmitted to the remote apparatus through the output interface 42.

According to the above configuration, the user can estimate the subject's symptom of septic shock, through a notification based on the temporal change of the fourth gradient G4. The symptom of septic shock is an example of the disease state.

In place of the output of the notification signal S3 corresponding to the temporal change of the fourth gradient G4, the processor 43 may output a notification signal S4 corresponding to a result of estimation of the symptom of septic shock. For example, the processor 43 is configured to estimate that the subject is in the warm shock condition in a case where the fourth gradient G4 is less than a prescribed threshold. The processor 43 is also configured to estimate that the subject is in the cold shock condition in a case where the fourth gradient G4 is no less than the prescribed threshold.

The notifier 49 may perform a notification based on the notification signal S4. The notification based on the notification signal S4 is performed by using at least one of visual notification, audible notification, and haptic notification. For example, an adequate index or alarm sound indicating that the symptom of septic shock is estimated may be displayed or outputted. The notification based on the notification signal S4 may be performed by an apparatus that is remote from the medical photometer 40. In this case, the notification signal S4 is transmitted to the remote apparatus through the output interface 42.

Example 10: Estimation of Symptom of Septic Shock

In this example, the photo emitter 10 includes a light source that emits an infrared light beam. The wavelength of the infrared light beam is determined such that the difference between the absorbance of oxygenated hemoglobin in blood and the absorbance of deoxygenated hemoglobin is less than a prescribed value. In other words, a wavelength at which the absorbance is hardly affected by a change of the oxygenation state is selected. Examples of such a wavelength of a red light beam include 805 nm and 940 nm.

The processor 43 outputs a control signal S2 that causes the photo emitter 10 to emit an infrared light beam, from the output interface 42. The photo detector 20 outputs a signal S1 corresponding to the quantity of the infrared light beam that has passed through the living tissue. The input interface 41 receives the signal S1.

The processor 43 acquires a temporal change of the intensity of the signal S1 while causing the pressurization controller 44 to control the pressurizing operation performed by the pressurization device 30. As a result, the temporal change of the intensity of the signal S1 that is thus acquired is as illustrated in FIG. 4A.

The processor 43 acquires a correlation value of the waveform factor of the pulse wave that is superimposed on the signal S1 before the pressurizing operation is performed, and that of the pulse wave that is superimposed on the signal S1 after the pressurizing operation is canceled. Examples of the correlation value include a difference value or a ratio therebetween. Specifically, the processor 43 acquires a correlation value with respect to waveform factors of the same kind in the plurality of waveform factors described with reference to FIG. 4B. When attention is paid to the amplitude Ap, for example, the processor 43 acquires the difference value (Ap1−Ap2) or the ratio (Ap1/Ap2) as the correlation value.

The processor 43 repeats the above-described operation to acquire a plurality of correlation values. The processor 43 acquires changes over time of the correlation value as the feature quantity.

The changes over time of the correlation value may be used in estimation of a symptom of septic shock. The changes over time of the correlation value is an example of the changes over time of the correlation value of the form factor of the pulse wave that is superimposed on the intensity change of the infrared light beam before the pressurizing operation is performed, and the form factor of the pulse wave that is superimposed on the intensity change of the infrared light beam after the pressurizing operation is canceled.

In the warm shock condition, the diastolic capability of peripheral vessels is enhanced. In this case, vasodilation occurs after the cancellation of the pressurizing operation, whereby the value of Ap2 is increased. This causes the difference value (Ap1−Ap2) to be decreased. In the cold shock condition, on the other hand, the diastolic capability of peripheral vessels is degraded. In this case, vasodilation hardly occurs after the cancellation of the pressurizing operation, whereby the difference value (Ap1−Ap2) is increased. In a case where the difference value (Ap1−Ap2) is temporally changed so as to be increased, degradation of the diastolic capability of peripheral vessels, or transfer to the cold shock condition may be estimated as an example of the symptom of septic shock.

The processor 43 outputs a notification signal S3 corresponding to the changes over time of the correlation value from the output interface 42. The notifier 49 may perform a notification based on the notification signal S3. The notification based on the notification signal S3 is performed by using at least one of visual notification, audible notification, and haptic notification. For example, a graph indicating the temporal change of the correlation value may be displayed on the display device. Alternatively, in a case where the correlation value is less than or no less than a prescribed threshold, an adequate index or alarm sound may be displayed or outputted. The notification based on the notification signal S3 may be performed by an apparatus that is remote from the medical photometer 40. In this case, the notification signal S3 is transmitted to the remote apparatus through the output interface 42.

According to the above configuration, the user can estimate the subject's symptom of septic shock, through a notification based on the changes over time of the correlation value. The symptom of septic shock is an example of the disease state.

In place of the output of the notification signal S3 corresponding to the changes over time of the correlation value, the processor 43 may output a notification signal S4 corresponding to a result of estimation of the symptom of septic shock. For example, the processor 43 is configured to estimate that the subject is transferred to the cold shock condition.

The notifier 49 may perform a notification based on the notification signal S4. The notification based on the notification signal S4 is performed by using at least one of visual notification, audible notification, and haptic notification. For example, an adequate index or alarm sound indicating that a symptom of septic shock is estimated may be displayed or outputted. The notification based on the notification signal S4 may be performed by an apparatus that is remote from the medical photometer 40. In this case, the notification signal S4 is transmitted to the remote apparatus through the output interface 42.

Example 11: Estimation of Transfer to Cold Shock Condition

In this example, the photo emitter 10 includes a first light source that emits a red light beam, and a second light source that emits an infrared light beam. The wavelengths of the red and infrared light beams are determined such that the absorbances of the hemoglobin in blood are different from each other. Examples of the wavelength of the red light beam include 660 nm. Examples of the wavelength of the infrared light beam include 940 nm.

The processor 43 outputs a control signal S2 that causes the photo emitter 10 to alternately emit the red and infrared light beams, from the output interface 42. The photo detector 20 alternately outputs a signal S11 corresponding to the quantity of the red light beam that has passed through the living tissue, and the signal S12 corresponding to the quantity of the infrared light beam that has passed through the living tissue. The input interface 41 alternately receives the signal S11 and the signal S12. The processor 43 acquires a temporal change of the intensity of the signal S11, and that of the intensity of the signal S12 while causing the pressurization controller 44 to control the pressurizing operation performed by the pressurization device 30.

Similarly to Example 1, the processor 43 acquires a difference value between the intensities of the signals S11 and S12. As a result, the temporal change of the difference value is as illustrated in FIG. 2B. The difference value between the intensities of the signals S11 and S12 is an example of the first correlation value.

The processor 43 acquires, as the feature quantity, a difference value D21 (=d2−d1) between the difference value d1 at the time point t1 and the difference value d2 at the time point t2. The difference value d1 is an example of the first correlation value that is obtained when the pressurizing operation by the pressurization device 30 is started. The difference value d2 is an example of the first correlation value that is obtained when the pressurizing operation by the pressurization device 30 is canceled. The difference value D21 is an example of the second correlation value.

The processor 43 further acquires a fourth gradient G4 as the feature quantity. The definition of the fourth gradient G4 described with reference to FIG. 5 can be applied to the fourth gradient G4 in FIG. 2B. The fourth gradient G4 is an example of the change amount of the first correlation value per a prescribed time period after the cancellation of the pressurizing operation.

A ratio of the intensities of the signals S11 and S12 may be acquired as another example of the first correlation value. In this case, a difference value between the ratios at the time points t1 and t2 is acquired as another example of the second correlation value.

In accordance with transfer from the warm shock condition to the cold shock condition, the blood flow in peripheral tissues is difficult to be maintained, whereby oxygen is insufficiently supplied to the peripheral tissues. This may cause multiple organ failure or the like. Therefore, it is important to detect the change of shock condition as early as possible to begin therapeutic intervention. However, the transfer process of the shock condition rapidly progresses in a complicated manner, and therefore it is known that the change of shock condition is difficult to be detected at an early stage.

The difference value D21 and the fourth gradient G4 may be used in estimation of transfer to the cold shock condition. In accordance with transfer to the cold shock condition, oxygen is insufficiently supplied to peripheral tissues, whereby the oxygen saturation of arterial blood that is eliminated by the pressurizing operation decreases. In this case, the intensity of the signal S12 is increased, whereby the difference value D21 is decreased. On the other hand, the blood flow that is supplied to the peripheral tissues is decreased, whereby the value of the fourth gradient G4 is increased (the negative gradient is decreased).

The processor 43 outputs a notification signal S3 corresponding to the difference value D21 and the fourth gradient G4 from the output interface 42. The notifier 49 may perform a notification based on the notification signal S3. The notification based on the notification signal S3 is performed by using at least one of visual notification, audible notification, and haptic notification. For example, an index indicating the difference value D21, and that indicating the fourth gradient G4 may be displayed on the display device. Alternatively, in a case where the difference value D21 is less than a prescribed threshold, and the fourth gradient G4 is more than a prescribed threshold, an adequate index or alarm sound may be displayed or outputted. The notification based on the notification signal S3 may be performed by an apparatus that is remote from the medical photometer 40. In this case, the notification signal S3 is transmitted to the remote apparatus through the output interface 42.

According to the above configuration, the user can estimate that the subject is transferring to the cold shock condition, through a notification based on the difference value D21 and the fourth gradient G4. The transfer to the cold shock condition is an example of the disease state.

In place of the output of the notification signal S3 corresponding to the difference value D21 and the fourth gradient G4, the processor 43 may output a notification signal S4 corresponding to a result of estimation of the transfer to the cold shock condition. In this case, the processor 43 is configured to, in a case where the difference value D21 is less than the prescribed threshold, and the fourth gradient G4 is more than a prescribed threshold, estimate that the subject is transferring to the cold shock condition.

The notifier 49 may perform a notification based on the notification signal S4. The notification based on the notification signal S4 is performed by using at least one of visual notification, audible notification, and haptic notification. For example, an adequate index or alarm sound indicating that the subject is transferring to the cold shock condition may be displayed or outputted. The notification based on the notification signal S4 may be performed by an apparatus that is remote from the medical photometer 40. In this case, the notification signal S4 is transmitted to the remote apparatus through the output interface 42.

Example 12: Estimation of Defective Oxygen Utilization in Living Tissue

In this example, the photo emitter 10 includes a first light source that emits a red light beam, and a second light source that emits an infrared light beam. The wavelengths of the red and infrared light beams are determined such that the absorbances of the hemoglobin in blood are different from each other. Examples of the wavelength of the red light beam include 660 nm. Examples of the wavelength of the infrared light beam include 940 nm.

The processor 43 outputs a control signal S2 that causes the photo emitter 10 to alternately emit the red and infrared light beams, from the output interface 42. The photo detector 20 alternately outputs a signal S11 corresponding to the quantity of the red light beam that has passed through the living tissue, and the signal S12 corresponding to the quantity of the infrared light beam that has passed through the living tissue. The input interface 41 alternately receives the signal S11 and the signal S12. The processor 43 acquires a temporal change of the intensity of the signal S11, and that of the intensity of the signal S12 while causing the pressurization controller 44 to control the pressurizing operation performed by the pressurization device 30.

Similarly to Example 1, the processor 43 acquires a difference value between the intensities of the signals S11 and S12. As a result, the temporal change of the difference value is as illustrated in FIG. 2B. The difference value between the intensities of the signals S11 and S12 is an example of the first correlation value. Another example of the first correlation value is the ratio of the intensities of the signals S11 and S12.

The processor 43 acquires, as the feature quantity, a difference value D21 (=d2−d1) between the difference value d1 at the time point t1 and the difference value d2 at the time point t2. The difference value d1 is an example of the first correlation value that is obtained when the pressurizing operation by the pressurization device 30 is started. The difference value d2 is an example of the first correlation value that is obtained when the pressurizing operation by the pressurization device 30 is canceled. The difference value D21 is an example of the second correlation value.

The processor 43 further acquires a fourth gradient G4 as the feature quantity. The definition of the fourth gradient G4 described with reference to FIG. 5 can be applied to the fourth gradient G4 in FIG. 2B. The fourth gradient G4 is an example of the change amount of the first correlation value per a prescribed time period after the cancellation of the pressurizing operation.

A ratio of the intensities of the signals S11 and S12 may be acquired as another example of the first correlation value.

In this case, a difference value between the ratios at the time points t1 and t2 is acquired as another example of the second correlation value.

In this example, in addition to the pressurization device 30, a blood flow interruption device 50 is attached to the subject as illustrated in FIG. 1. The blood flow interruption device 50 is attached to, for example, a proximal portion of the finger of the subject to which the pressurization device 30 is attached. The blood flow interruption device 50 may include a cuff that pressurizes the living tissue by an air pressure, an actuator that pressurizes the living tissue by a movable member, or the like.

The press intensity may be determined as a pressure that is sufficiently higher than the arterial blood pressure in the living tissue. The air pressure in the case where the cuff is used may be set as, for example, 300 mmHg. The pressing force in the case where the actuator is used may be set as, for example, 500 gf. This prevents blood from flowing into and out of the living tissue that is pressurized by the pressurization device 30.

The pressurization controller 44 is configured to control the pressurizing operation performed by the blood flow interruption device 50 that is attached to the body of the subject, thereby changing at least one of the amount of blood that flows into the living tissue, and that of blood that flows out of the living tissue. In the following description, the pressurizing operation performed by the blood flow interruption device 50 is referred to as the blood flow interrupting operation.

In the case where the blood flow interruption device 50 includes the cuff, the pressurization controller 44 may include a pump and valve for adjusting the air pressure in the cuff. In the case where the blood flow interruption device 50 includes the actuator, the pressurization controller 44 may include a circuit that outputs a control signal for adjusting the displacement amount of the actuator. In this case, the control signal may be outputted from the output interface 42. The operation of the pressurization controller 44 may be controlled by the processor 43.

Figure 7:
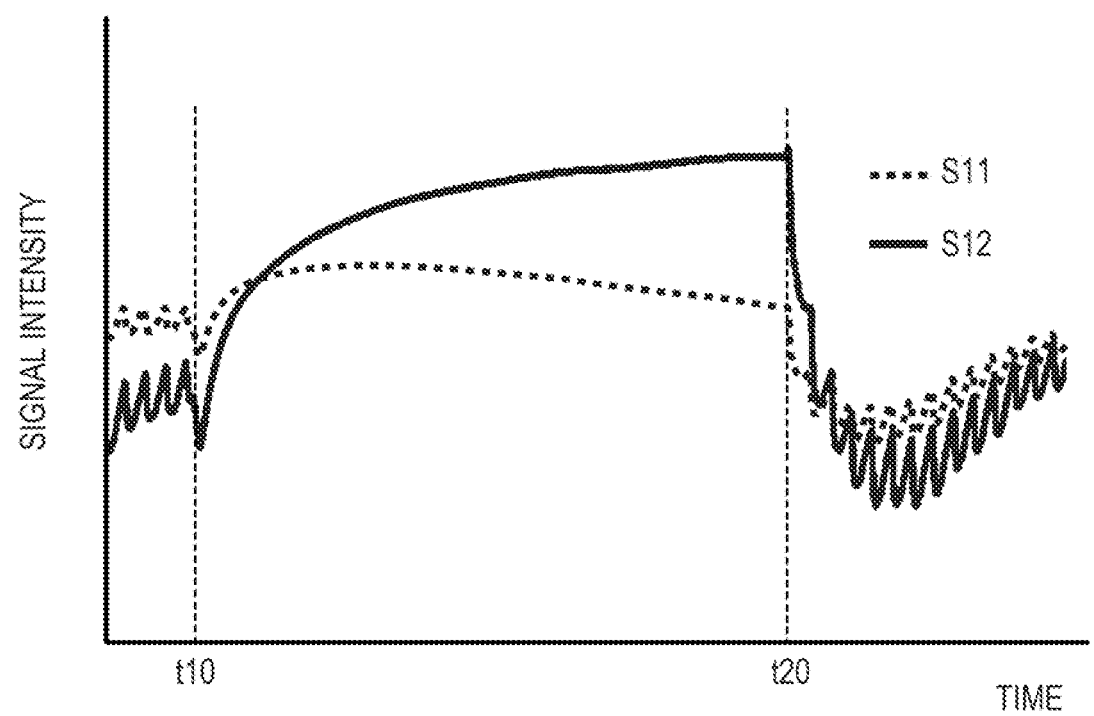
FIG. 7 illustrates an exemplary operation of the medical photometer.

The processor 43 acquires a temporal change of the intensity of the signal S11, and that of the intensity of the signal S12 while causing the pressurization controller 44 to control the blood flow interrupting operation performed by the blood flow interruption device 50. FIG. 7 illustrates the temporal changes of the intensities of the signals S11 and S12 that are acquired as described above.

The reference symbol t10 indicates a time point when the blood flow interruption device 50 starts the blood flow interrupting operation. In accordance with the pressurization, oxygen in blood is consumed in a state where the flow of blood in and out of the living tissue is blocked, whereby the concentration of deoxygenated hemoglobin is increased, whereas the concentration of oxygenated hemoglobin is decreased. At this time, since the red light beam is more absorbed, the intensity of the signal S11 is decreased. On the other hand, since the infrared light beam is less absorbed, the intensity of the signal S12 is increased.

The reference symbol t20 indicates a time point when the blood flow interruption device 50 cancels the blood flow interrupting operation. In accordance with the cancellation of the pressurization, blood flows into the living tissue, whereby the intensities of the signals S11 and S12 are recovered to those that are obtained before the pressurization, respectively.

Even during the blood flow interrupting operation performed by the blood flow interruption device 50, the processor 43 acquires the difference value between the intensities of the signals S11 and S12. The processor 43 acquires a change amount of the difference value per a prescribed time period during the blood flow interrupting operation, as the feature quantity.

It is known that, when anaerobic metabolism is enhanced in a patient with sepsis, the patient descends into defective oxygen utilization in which aerobic metabolism does not recover even when peripheral circulatory is improved and oxygen is sufficiently supplied. It is advocated that, in order to treat the defective oxygen utilization, a treatment using only maintenance of the circulatory status and oxygen administration is not sufficient, but improvement of the metabolic function is necessary.

The difference value D21, the fourth gradient G4, and the change amount of the difference value of the intensities of the signals S11 and S12 per the prescribed time period during the blood flow interrupting operation may be used in estimation of defective oxygen utilization in the living tissue. In a case where aerobic metabolism is normally performed during the blood flow interrupting operation, the intensity changes of the signals S11 and S12 exhibit behaviors that are illustrated in FIG. 7. By contrast, in a case where aerobic metabolism is not normally performed during the blood flow interrupting operation, both the intensity changes of the signals S11 and S12 are decreased. Therefore, the change amount of the difference value of the both intensities per the prescribed time period is decreased as well. In a case where, although the difference value D21 and fourth gradient G4 that are acquired through the pressurization operation performed by the pressurization device 30 are the normal values, the change amount of the difference value of the intensities of the signals S11 and S12 per the prescribed time period is less than a prescribed threshold, defective oxygen utilization of the living tissue is estimated.

The processor 43 outputs a notification signal S3 corresponding to these feature quantities from the output interface 42. The notifier 49 may perform a notification based on the notification signal S3. The notification based on the notification signal S3 is performed by using at least one of visual notification, audible notification, and haptic notification. For example, indices indicating the feature values may be displayed on the display device. Alternatively, in a case where, although the difference value D21 and the fourth gradient G4 are the normal values, the change amount of the difference value of the intensities of the signals S11 and S12 per the prescribed time period is less than the prescribed threshold, an adequate index or alarm sound may be displayed or outputted. The notification based on the notification signal S3 may be performed by an apparatus that is remote from the medical photometer 40. In this case, the notification signal S3 is transmitted to the remote apparatus through the output interface 42.

According to the above configuration, the user can estimate defective oxygen utilization in the living tissue of the subject, through a notification based on these feature quantities. Defective oxygen utilization is an example of the physiological state of the living tissue or the disease state.

In place of the output of the notification signal S3 corresponding to these feature quantities, the processor 43 may output a notification signal S4 corresponding to a result of estimation of defective oxygen utilization in the living tissue. In this case, the processor 43 is configured to, in a case where, although the difference value D21 and the fourth gradient G4 are the normal values, the change amount of the difference value of the intensities of the signals S11 and S12 per the prescribed time period is less than the prescribed threshold, estimate defective oxygen utilization of the living tissue of the subject.

The notifier 49 may perform a notification based on the notification signal S4. The notification based on the notification signal S4 is performed by using at least one of visual notification, audible notification, and haptic notification. For example, an adequate index or alarm sound indicating that defective oxygen utilization in the living tissue is estimated may be displayed or outputted. The notification based on the notification signal S4 may be performed by an apparatus that is remote from the medical photometer 40. In this case, the notification signal S4 is transmitted to the remote apparatus through the output interface 42.

As illustrated in FIG. 1, the processor 43 may be configured to, by using a classifier 431, estimate at least one of the disease state of the subject and the physiological state of the living tissue. The classifier 431 is the designation of a processing algorithm that is executed by the processor 43.

The classifier 431 is configured through machine learning performed in advance. Training data that are used in the machine learning are formed by acquiring relationships between inputs and outputs from plural subjects. The input may be a temporal change of the signal that is inputted to the input interface 41, the temporal change being caused by the pressurizing operation performed on each subject with the pressurization device 30. The output may be at least one of the disease state of the subject, and physiological state of the living tissue that are obtained as a result of paying attention to at least one prescribed feature quantity in the input. As the prescribed feature quantity, the feature quantities that have been described with reference to Examples 1 to 12 may be used. As the at least one of the disease state and the physiological state of the living tissue, the states that have been described with reference to Examples 1 to 12 may be used as well.

For instance, the case where the processor 43 performs the estimation of Example 4 by using the classifier will be described. The feature quantity is the difference value I31 that is illustrated in FIG. 3. The estimation target is edema. The classifier 431 is configured to determine a likelihood corresponding to the possibility that a subject who provides the signal S1 that is currently inputted to the input interface 41 experiences edema, through the machine learning in which the difference value I31 in the signal S1 acquired from each of subjects who experience edema, and the difference value I31 in the signal S1 acquired from each of subjects who do not experience edema are used as the training data. For example, the classifier may be a support vector machine (SVM). In this case, the likelihood is calculated as an SVM score.

Specifically, the processor 43 acquires the difference value I31 of the signal S1, and supplies the difference value to the classifier 431. The classifier 431 calculates an SVM score with respect to the input difference value I31. In a case where the calculated SVM score is no less than a prescribed value, the processor 43 estimates that the possibility that the subject who provides the signal S1 experiences edema is high.

The processor 43 outputs a notification signal S4 corresponding to a result of estimation of edema. The notifier 49 performs a notification based on the notification signal S4. The notification based on the notification signal S4 is performed by using at least one of visual notification, audible notification, and haptic notification. For example, an adequate index or alarm sound indicating that edema is estimated may be displayed or outputted. The notification based on the notification signal S4 may be performed by an apparatus that is remote from the medical photometer 40. In this case, the notification signal S4 is transmitted to the remote apparatus through the output interface 42.

According to the above configuration, the processor 43 may be caused to perform empirical estimation of at least one of the disease state of the subject and the physiological state of the living tissue, through the machine learning based on the data that were acquired in the past from plural subjects. In this case, the flexibility of the system can be enhanced as compared with the strict rule-based estimation.

Another example of the classifier that identifies whether a desired estimation result is available or not, logistic regression may be used. In a case where a plurality of feature quantities are used in estimation as in above-described Examples 11 and 12, a perceptron, a decision tree, a random forest, or the like may be used as the classifier.

The training data that are used in the machine learning of the classifier 431 may include clinical data of each subject. The clinical data may include at least one of the age, the sex, the height, the weight, data of previous diseases, vital data, biochemical test data, blood test data, data of administered medicines, the setting of a respirator, the setting of a dialyzer, the setting of an external circulator, the severity score, and the like. The vital data may include at least one of the heart rate, the respiration rate, the blood pressure, the arterial oxygen saturation, the expired carbon dioxide concentration, and the like. The severity score may include at least one of a SOFA (Sequential Organ Failure Assessment) score, a qSOFA (quick SOFA) score, an APACHE (Acute Physiology and Chronic Health Evaluation) score, a SAPS (Simplified Acute Physiology Score), and the like. In the case of the above-described example, clinical data of a subject who experiences edema are correlated with the difference value I31 in the signal S1 acquired from the subject. Similarly, clinical data of a subject who does not experience edema are correlated with the difference value I31 in the signal S1 acquired from the subject.

In this case, the processor 43 is configured to, when at least one of the disease state and physiological state of the living tissue of a subject is to be estimated by using the classifier 431, refer to clinical information of the subject. As illustrated in FIG. 1, at least part of the clinical information C may be supplied to the input interface 41 from an external sensor or medical equipment. Additionally or alternatively, at least part of the clinical information C may be stored in a storage 46 that is incorporated in the medical photometer 40. The storage 46 is a memory device that is realized by a semiconductor memory or a hard disk drive.

Namely, the processor 43 uses the clinical information C in calculation of an SVM score. In a case where training data that are acquired from plural subjects who experience edema show a tendency that specific vital data are high, and the value of the vital data acquired from the present subject is high, an SVM score corresponding to the possibility of edema is calculated to be higher. According to the above configuration, the estimation accuracy can be further enhanced as compared with the case where only the feature quantity is supplied to the classifier 431.

The processor 43 having each of the functions described above may be realized by a general-purpose microprocessor that operates in cooperation with a general-purpose memory. Examples of the general-purpose microprocessor may include a CPU, an MPU, and a GPU. Examples of the general-purpose memory may include a RAM and a ROM. In this case, a computer program for executing the above-described processing may be preinstalled in the ROM. The processor 43 designates at least a part of the computer program stored in the ROM, loads the designated part of the computer program in the RAM, and executes the above-described processing in cooperation with the RAM. In this case, the general-purpose memory is an example of the non-transitory computer readable medium having stored the computer program. The computer program may be downloaded from an external server device over a communication network to be stored in the general-purpose memory. In this case, the server device is an example of the non-transitory computer readable medium having stored the computer program. At least a part of the storage 46 may be realized by the above-described general-purpose memory.

The processor 43 may be realized by a dedicated integrated circuit that can execute a computer program for executing the above-described processing. Examples of the dedicated integrated circuit may include a micro controller, an ASIC, and an FPGA. In this case, a computer program for executing the above-described processing may be preinstalled in a memory device in the integrated circuit. The memory device is an example of the non-transitory computer readable medium having stored the computer program. At least a part of the storage 46 may be realized by the memory device.

The processor 43 may be realized by a combination of a general-purpose microprocessor and a dedicated integrated circuit.

The above-described embodiment is a mere example for facilitating understanding of the presently disclosed subject matter. The configuration of each embodiment may be adequately changed or modified without departing from the gist of the presently disclosed subject matter.

As described with reference to FIG. 5, each of the first gradient G1, the second gradient G2, the third gradient G3, the fourth gradient G4, and the fifth gradient G5 may serve as the feature quantity. However, each of the first time period T1, the second time period T2, the third time period T3, the fourth time period T4, and the fifth time period T5 that are used in definition of these gradients may also serve as the feature quantity. For example, a less value of the fifth gradient G5 (the negative gradient is increased) corresponds to a shorter fifth time period T5.

The place to which the pressurization device 30 is to be attached is not limited to the fingertip of the subject. For example, the pressurization device 30 may be attached to the front arm of the subject. In this case, the photo detector 20 is configured to receive the light beam that is emitted from the photo emitter 10, and that is reflected from the living tissue. In this case, the blood flow interruption device 50 may be attached to the upper arm of the subject.

The present application is based on Japanese Patent Application No. 2019-123717 filed on Jul. 2, 2019, the entire contents of which are hereby incorporated by reference.

The invention claimed is:
1. A medical photometer comprising:
an input interface configured to receive a signal corresponding to a quantity of light that has passed through a living tissue of a subject;
a pressurization controller configured to control a pressurizing operation performed with a pressurization device adapted to be attached to a body of the subject, thereby changing at least one of a thickness of the living tissue, an amount of blood contained in the living tissue, an amount of cellular interstitial fluid contained in the living tissue, an amount of blood flowing into the living tissue, and an amount of blood flowing out from the living tissue;
a processor configured to acquire, from a temporal change of the signal due to the pressurizing operation, a first correlation value between quantities of a first infrared light and a second infrared light; and
a notifier,
wherein the light includes:
the first infrared light for which for which a difference between the absorbance of oxygenated hemoglobin in blood and absorbance of deoxygenated hemoglobin is less than a prescribed value; and
the second infrared light for which absorbance of water is more than absorbance of hemoglobin;
wherein the processor is configured to acquire a second correlation value corresponding to a correlation between the first correlation value obtained when the pressurizing operation is started and the first correlation value obtained when the pressurizing operation is canceled; and
wherein the processor is configured to cause the notifier to perform notification that intraperitoneal bleeding is estimated as a disease state of the subject, in a case where the second correlation value satisfies a prescribed condition.

2. A medical photometer comprising:
an input interface configured to receive a signal corresponding to a quantity of light that has passed through a living tissue of a subject;
a pressurization controller configured to control a pressurizing operation performed with a pressurization device adapted to be attached to a body of the subject, thereby changing at least one of a thickness of the living tissue, an amount of blood contained in the living tissue, an amount of cellular interstitial fluid contained in the living tissue, an amount of blood flowing into the living tissue, and an amount of blood flowing out from the living tissue;
a processor configured to acquire, from a temporal change of the signal due to the pressurizing operation, at least one form factor of a locus of a point specified by quantities of a first infrared light and a second infrared light on a coordinate plane that is defined by a first coordinate axis corresponding to the quantity of the first infrared light and a second coordinate axis corresponding to the quantity of the second infrared light; and
a notifier,
wherein the light includes:
the first infrared light for which for which a difference between the absorbance of oxygenated hemoglobin in blood and absorbance of deoxygenated hemoglobin is less than a prescribed value; and
the second infrared light for which absorbance of water is more than absorbance of hemoglobin,
wherein the at least one form factor is selected from:
at least one area formed by the locus; and
at least one of multiple gradients each of which is associated with one of multiple time periods after the pressurizing operation is canceled; and
wherein the processor is configured to
cause the notifier to perform notification that edema is estimated as a disease state of the subject, in a case where the form factor satisfies a prescribed condition.

* * * * *